US010578756B2

(12) United States Patent
Asgedom et al.

(10) Patent No.: US 10,578,756 B2
(45) Date of Patent: Mar. 3, 2020

(54) METHODS AND SYSTEMS TO DETERMINE PROPERTIES OF A SUBTERRANEAN FORMATION

(71) Applicant: PGS Geophysical AS, Oslo (NO)

(72) Inventors: Endrias G. Asgedom, Oslo (NO); Elsa Cecconello, Oslo (NO); Okwudili Orji, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 409 days.

(21) Appl. No.: 15/429,630

(22) Filed: Feb. 10, 2017

(65) Prior Publication Data

US 2017/0234998 A1    Aug. 17, 2017

Related U.S. Application Data

(60) Provisional application No. 62/294,148, filed on Feb. 11, 2016.

(51) Int. Cl.
*G01V 1/28* (2006.01)
*G01V 1/38* (2006.01)

(52) U.S. Cl.
CPC ............... *G01V 1/282* (2013.01); *G01V 1/38* (2013.01); *G01V 2210/57* (2013.01); *G01V 2210/614* (2013.01); *G01V 2210/6161* (2013.01)

(58) Field of Classification Search
CPC ...... G01V 1/282; G01V 1/38; G01V 2210/57; G01V 2210/614; G01V 2210/6161
See application file for complete search history.

(56) References Cited

U.S. PATENT DOCUMENTS

| 9,921,325 | B2* | 3/2018 | Hegna | G01V 1/36 |
| 2010/0274492 | A1* | 10/2010 | Rentsch | G01V 1/3808 |
| | | | | 702/14 |
| 2016/0061977 | A1* | 3/2016 | Turnbull | G01V 1/36 |
| | | | | 702/17 |

OTHER PUBLICATIONS

Thorsos, Eric I., "The validity of the Kirchhoff approximation for rough surface scattering using a Gaussian roughness spectrum," J. Acoust. Soc. Am. 83(1), Jan. 1988, pp. 78-92.

(Continued)

Primary Examiner — Elias Desta

(57) ABSTRACT

The current disclosure is directed to methods and systems to determine properties of a subterranean formation located below a body of water. The methods and systems compute synthetic pressure and velocity vector wavefields that represent acoustic energy interactions within a model environment that comprises a model body of water located above a model subterranean formation. The model environment is separated into a stationary region and a time-varying region. The methods and systems include determining properties of the subterranean formation by iteratively adjusting the model environment to approximate the actual subterranean formation. The model environment is iteratively adjusted until a minimum difference between the synthetic pressure and velocity vector wavefields computed for each change to the model environment and actual pressure and velocity wave fields obtained from a marine seismic survey of the subterranean formation is achieved.

25 Claims, 30 Drawing Sheets

(56) References Cited

OTHER PUBLICATIONS

Fokkema, J.T., et al., "Seismic Applications of Acoustic Reciprocity," Elsevier Science Publisher B.V., 1993, pp. 63-73; 95-105; 107-115.
Orji, Okwudili C., "Effects of time-varying sea surface in marine seismic data," Geophysics, vol. 77, No. 3 (May-Jun. 2012); pp. 33-43.

\* cited by examiner

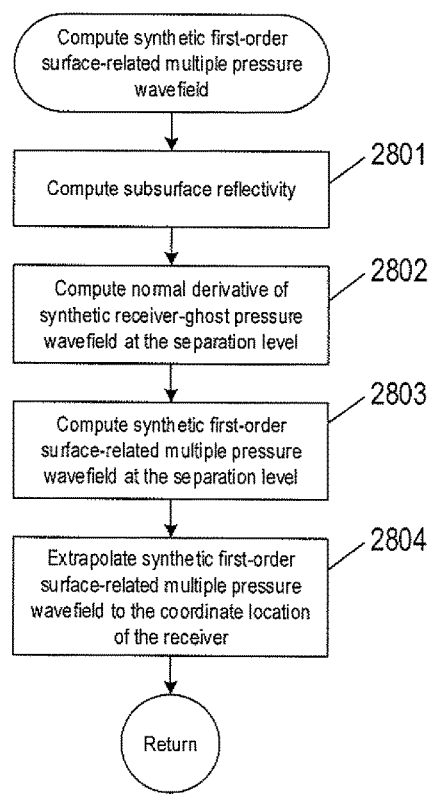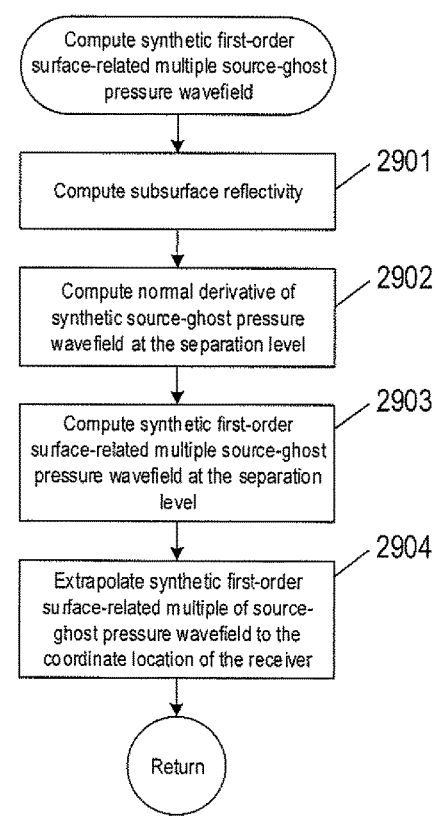
FIG. 28
FIG. 29

METHODS AND SYSTEMS TO DETERMINE PROPERTIES OF A SUBTERRANEAN FORMATION

CROSS-REFERENCE TO A RELATED APPLICATION

This application claims the benefit of Provisional Application 62/294,148, filed Feb. 11, 2016.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images are used to determine the structure of subterranean formations, discover hydrocarbon deposits, and monitor hydrocarbon deposits during production. A typical marine seismic survey is carried out with a survey vessel that tows one or two sources and a number of streamers below the surface of the body of water. A typical source comprises an array of source elements, such as air guns. The streamers are elongated cable-like structures towed behind the survey vessel in the direction the survey vessel is traveling. Each streamer includes a number of receivers that generate seismic data in response to detecting pressure and/or particle motion wavefields. The streamers are arranged substantially parallel to one another to form a seismic data acquisition system. The survey vessel contains seismic acquisition equipment, such as navigation control, source control, seismic receiver control, and seismic data recording equipment.

A typical marine seismic survey is carried out by activating the one or more sources above a subterranean formation. Each activation produces acoustic energy that expands outward in all directions. A portion of the acoustic energy travels downward through the body of water and into the subterranean formation. At each interface between different types of rock and sediment, a portion of the acoustic energy is refracted, a portion is transmitted, and another portion is reflected from each interface into the body of water to propagate toward the free surface. The portion of the acoustic energy reflected into the body of water is measured by the receivers and is recorded as seismic data that is processed to generate seismic images of the subterranean formation.

In recent years, seismic data modelling has become an important tool in marine seismology. Seismic data modelling techniques simulate propagation of acoustic energy in a model subterranean formation and generates synthetic seismic data collected by synthetic receivers. Seismic data modelling techniques that include actual geological information about a subterranean formation may be used to generate synthetic seismic data that is used to identify features of the subterranean formation. For example, the synthetic seismic data may be used to estimate rock properties of various layers of the subterranean formation and determine whether or not oil, gas, or water reservoirs are present in the subterranean formation. Seismic data modelling may be applied to a model subterranean formation in order to generate synthetic seismic data that is used to test, or benchmark changes to, seismic data processing and imaging techniques. Seismic data modelling may also be used to design marine seismic surveys. Having a good model subterranean formation may be useful in transitioning from a two-dimensional survey to a three-dimensional survey or designing a new marine seismic survey if seismic data obtained in a previous marine seismic survey failed to meet certain requirements.

Typical seismic data modelling techniques used to generate synthetic seismic data of a model subterranean formation located beneath a body of water are based on an assumption that the body of water through which acoustic energy propagates is a time invariant (i.e., stationary) medium. However, actual bodies of water are constantly in motion due to water currents and weather, which has an effect on the propagation of acoustic energy between the free surface of the body of water and the subterranean formation. Real seismic data collected in an actual marine seismic survey records the effects of this constantly changing environment. As a result, synthetic seismic data produced by typical seismic data modelling techniques may not accurately compare with real seismic data collected in an actual marine seismic survey and, therefore, may not always be relied upon to estimating rock properties of subterranean formation, identify the contents of a subterranean reservoir, and design a marine seismic survey.

DESCRIPTION OF THE DRAWINGS

FIG. 28 shows a control-flow diagram of a routine "compute synthetic first-order surface-related multiple pressure wavefield" called in FIG. 22.

FIG. 29 shows a control-flow diagram of a routine "compute synthetic first-order surface-related multiple source-ghost pressure wavefield" called in FIG. 22.

DETAILED DESCRIPTION

The current disclosure is directed to methods and systems to determine properties of a subterranean formation located below a body of water. The methods and systems compute a synthetic pressure wavefield that represents acoustic energy interactions within a model environment that comprises a model body of water located above a model subterranean formation. The model environment is separated into a stationary region and a time-varying region. The stationary region includes the subterranean formation and a lower portion of the model body of water. The time-varying region is located between the stationary region and a time-varying free surface of the model body of water. Synthetic pressure wavefields that characterize acoustic energy propagation within the time-varying region are computed using an integral-based Kirchhoff method. Synthetic pressure wavefields that characterize acoustic energy propagation and reflections from surfaces of the subterranean formation in the stationary region are computed using ray tracing or a finite difference (FD) method. The methods described below couple the synthetic pressure wavefields in the stationary and time-varying regions using acoustic reciprocity to obtain synthetic pressure and velocity vector wavefields that characterize acoustic energy propagation in the model environment.

Methods and systems determine properties of the subterranean formation by iteratively adjusting the model environment to approximate the actual subterranean formation. The model environment is iteratively adjusted until a minimum difference between the synthetic pressure wavefield computed for each change to the model environment and an actual pressure wavefield obtained from a marine seismic survey of the subterranean formation is achieved. The resulting model environment approximates the actual subterranean formation. Seismic imaging and other seismic data processing techniques may be applied to the model environment to determine subsurface rock properties of the subterranean formation, identify a potential hydrocarbon reservoir, or monitor a hydrocarbon reservoir under production. Synthetic pressure wavefield computed for an actual state of the free surface may be used to determine a low-frequency compensation ("LFC") limit that is in turn used to set the LFC limit in an actual marine seismic survey. The synthetic pressure and velocity vector wavefields may be used with reverse-time migration ("RTM") and actual pressure wavefield recorded in a marine seismic survey to generate an image of a subterranean formation. Methods also include computing a synthetic velocity vector wavefield from the synthetic pressure wavefield. The synthetic pressure and velocity vector wavefields may be used to determined properties of a subterranean formation.

Marine Seismic Surveying

Figure 1A:
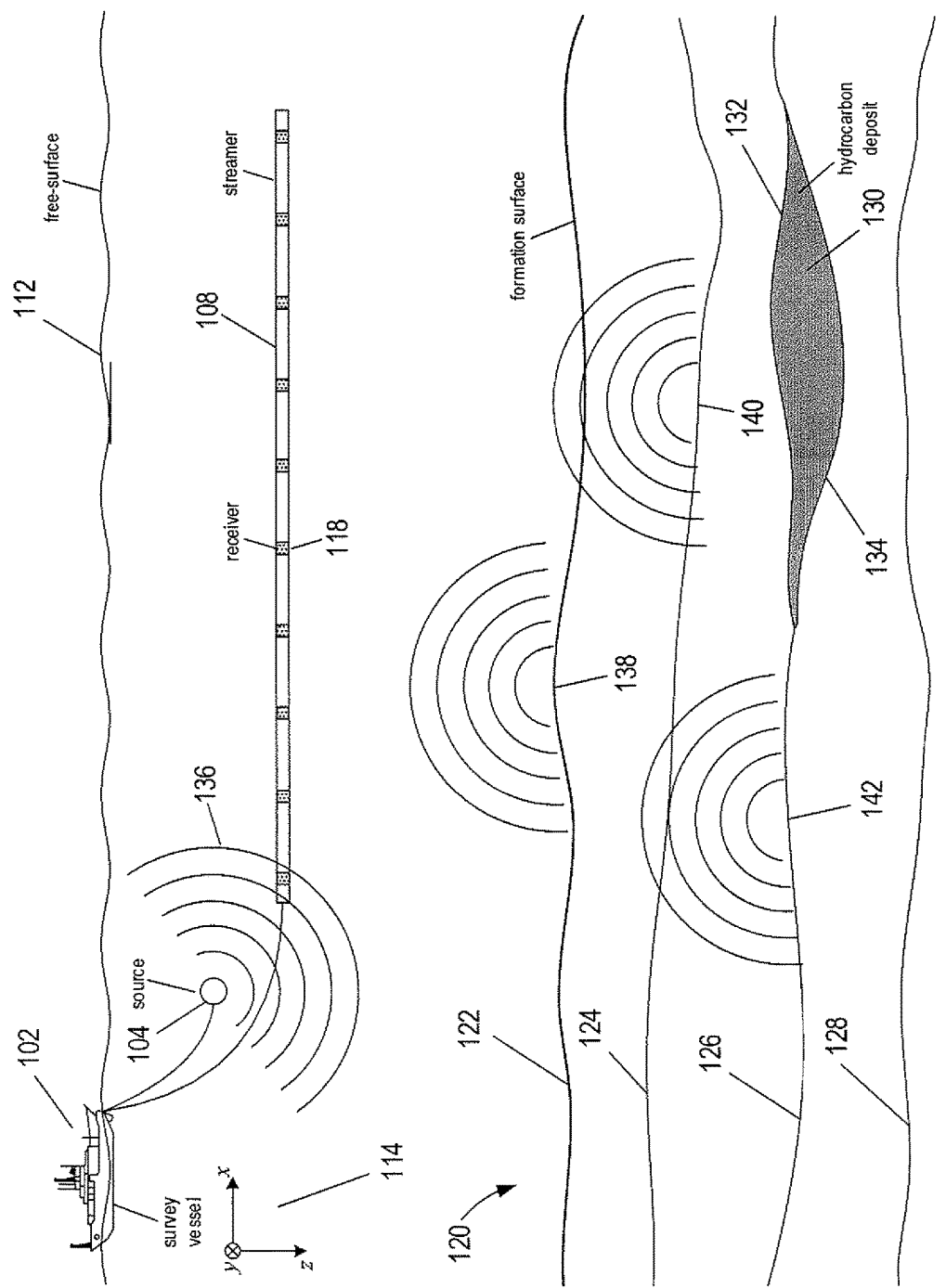
FIGS. 1A-1B show side-elevation and top views of an example seismic data acquisition system.
Figure 1B:
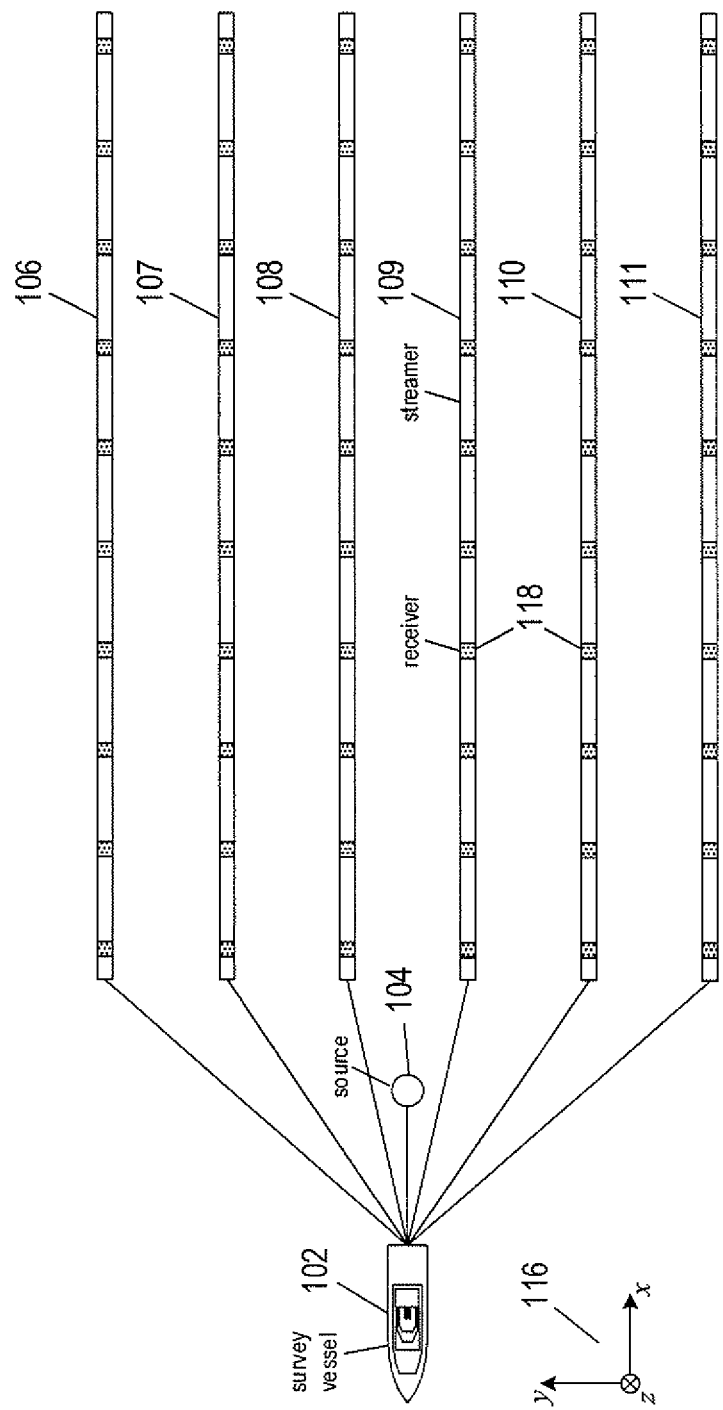

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may have a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
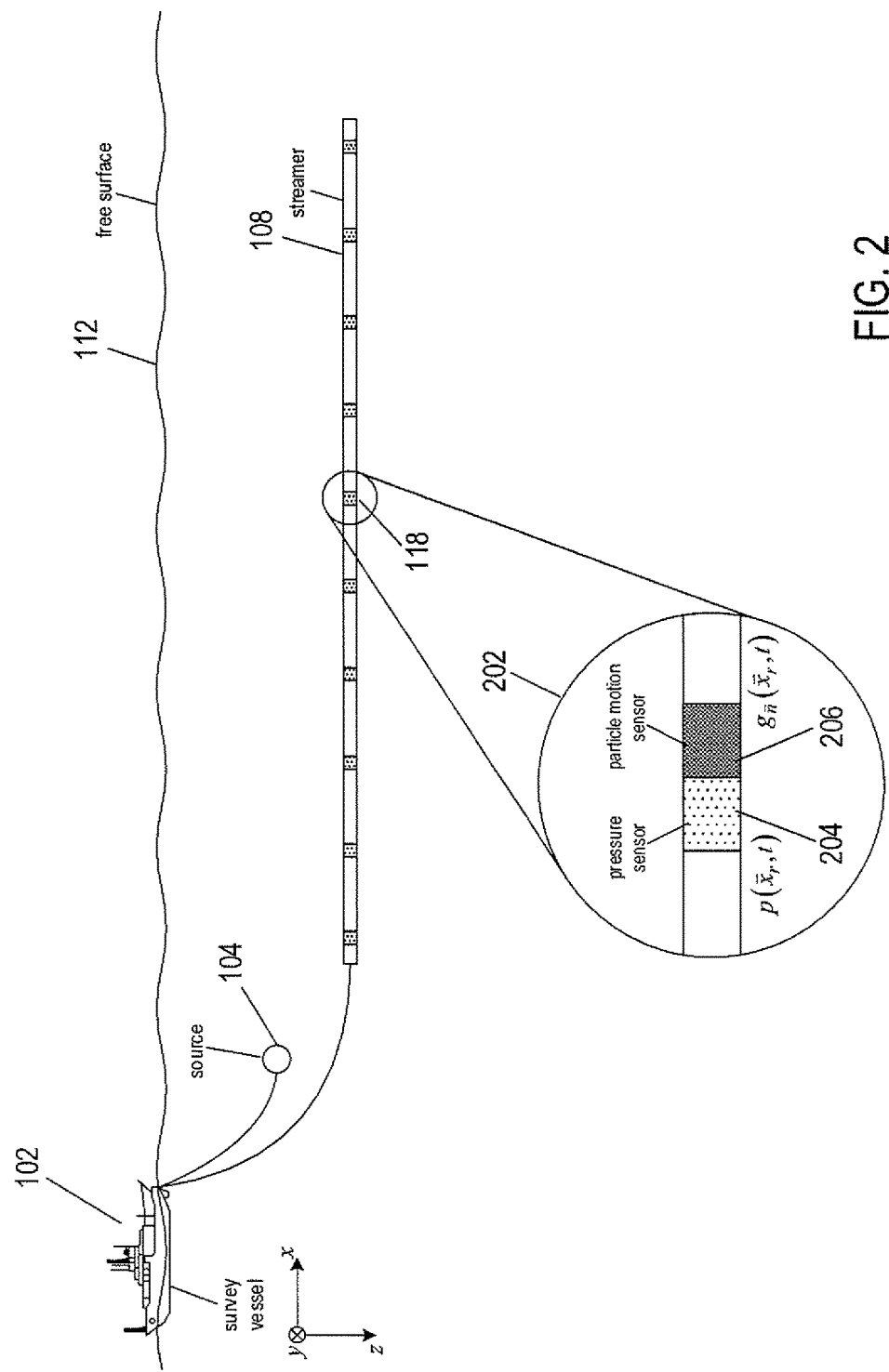
FIG. 2 shows a side-elevation view of a seismic data acquisition system with a magnified view of a receiver.

Each receiver 118 may be a multi-component sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system with a magnified view 202 of the receiver 118. In this example, the magnified view 202 reveals that the receiver 118 is a multi-component sensor comprising a pressure sensor 204 and a particle motion sensor 206. The pressure sensor may be, for example, a hydrophone. Each pressure sensor is a non-directional sensor that measures changes in hydrostatic pressure over time to produce pressure data denoted by $p(\vec{x}_r, t)$, where $\vec{x}_r$ represents the Cartesian coordinates ($x_r$, $y_r$, $z_r$) of a receiver, superscript r is a receiver index, and t represents time. The particle motion sensors may be responsive to water motion. In general, particle motion sensors detect particle motion (i.e., displacement, velocity, or acceleration) in a particular direction and may be responsive to such directional displacement of the particles, velocity of the particles, or acceleration of the particles. A particle motion sensor that measures particle displacement generates particle displacement data denoted by $g_{\vec{n}}(\vec{x}_r, t)$, where the vector $\vec{n}$ represents the direction along which particle displacement is measured. A particle motion sensor that measures particle velocity (i.e., particle velocity sensor) generates particle velocity data denoted by $v_{\vec{n}}(\vec{x}_r, t)$. A particle motion sensor that measures particle acceleration (i.e., accelerometer) generates particle acceleration data denoted by $a_{\vec{n}}(\vec{x}_r, t)$. The data generated by one type of particle motion sensor may be converted to another type. For example, particle displacement data may be differentiated to obtain particle velocity data, and particle acceleration data may be integrated to obtain particle velocity data.

The term "particle motion data" is a general term used to refer to particle displacement data, particle velocity data, or particle acceleration data, and the term "seismic data" is used to refer to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n}=(0,0,z)$) in which case $g_z(\vec{x}_r, t)$ is called vertical displacement data, $v_z(\vec{x}_r, t)$ is called vertical velocity data, and $a_z(\vec{x}_r, t)$ is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the inline velocity data, $v_x(\vec{x}_r, t)$, and a particle motion sensor that measures the wavefield in the cross-line direction in order to obtain the cross-line velocity data, $v_y(\vec{x}_r, t)$. In certain implementations, the receivers may be only pressure sensors, and in other implementations, the receivers may be only particle motion sensors. The three orthogonal velocity data sets form a velocity vector $\vec{v} = (v_x, v_y, v_z)$.

The streamers 106-111 and the survey vessel 102 may include sensing electronics and data-processing facilities that allow seismic data generated by each receiver to be correlated with the time each source of the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102 and/or transmitted onshore to a seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 to 5 ms. A trace is a recording of a subterranean formation response to acoustic energy that passes from an activated source, into the subterranean formation where a portion of the acoustic energy is reflected and/or refracted, and ultimately detected by a sensor as described above. A trace records variations in a time-dependent amplitude that corresponds to fluctuations in acoustic energy of the wavefield measured by the sensor.

In general, each trace is an ordered set of discrete spatial and time-dependent pressure or motion sensor amplitudes denoted by:

$$tr(t, \vec{x}_r, \vec{x}_s) = \{A(t_j, \vec{x}_r, \vec{x}_s)\}_{j=0}^{J-1} \quad (1)$$

where
tr represents pressure, particle displacement, particle velocity, or particle acceleration amplitude;
A represents amplitude;
$t_j$ is the j-th sample time; and
J is the number of time samples in the trace.

The coordinate location $\vec{x}_r$ of each receiver may be calculated from global position information obtained from one or more global positioning devices located along the streamers, survey vessel, and buoys and the known geometry and arrangement of the streamers and receivers. The coordinate location $\vec{x}_s$ of the source 104 may also be obtained from one or more global positioning devices located at each source and the know geometry and arrangement of source elements of the source 104. Each trace also includes a trace header not represented in Equation (1) that identifies the specific receiver that generated the trace, receiver and source GPS spatial coordinates, and may include time sample rate and the number of time samples.

Figure 3:
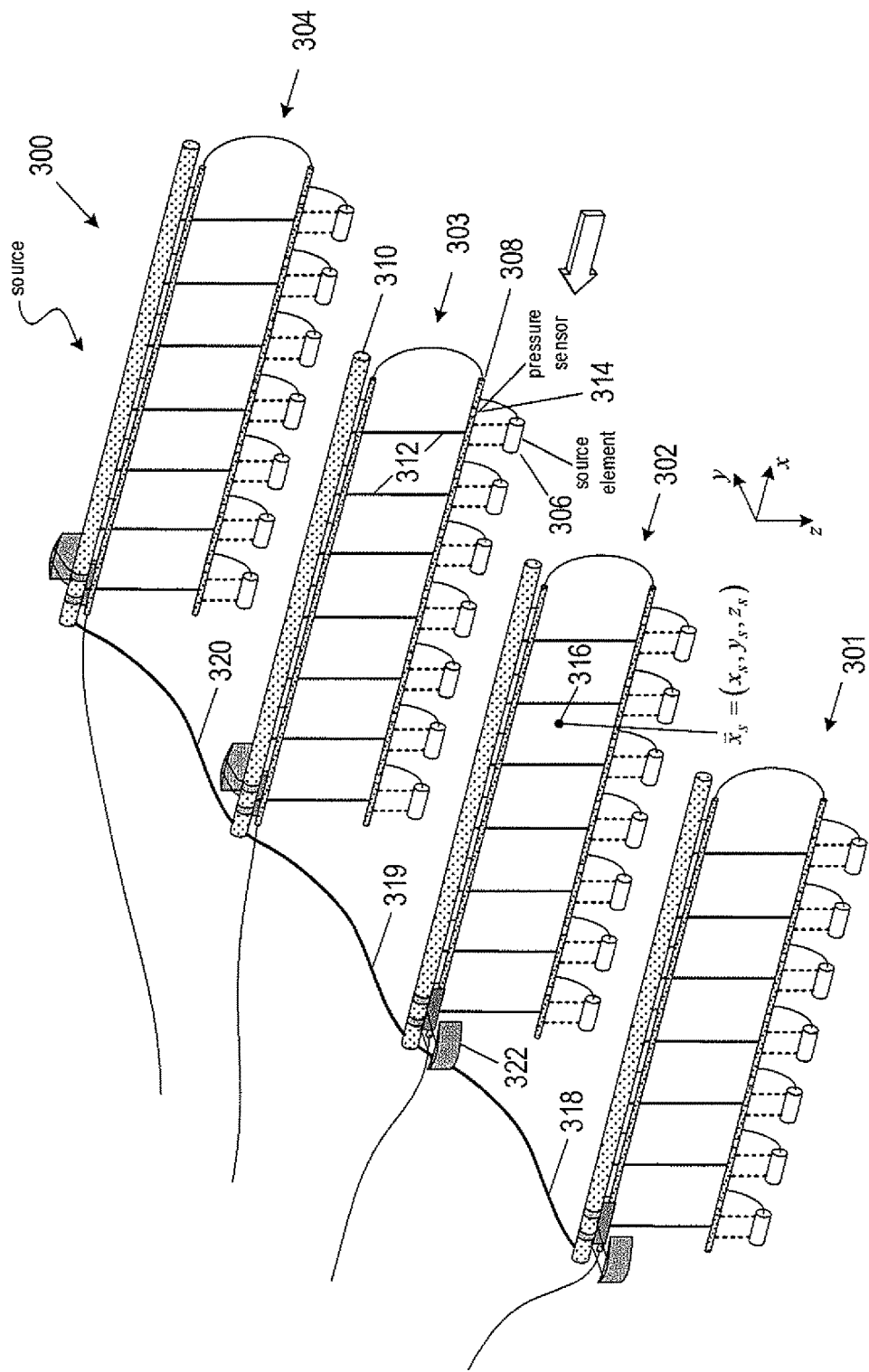
FIG. 3 shows an isometric view of an example source.

The source 104 comprises one or more sub-arrays of source elements. The source elements may be air guns or water guns. FIG. 3 shows an isometric view of an example source 300 that comprises four similarly configured sub-arrays 301-304. For example, the sub-array 303 includes seven source elements, such as source element 306, suspended from a semi-rigid rod 308 that is suspended from a float 310 by depth ropes 312. The sub-array 303 also includes seven pressure sensors, such as pressure sensor 314, that are each located in close proximity to one of the source elements. For example, the pressure sensor 314 is located in the near field (e.g., approximately 1 m to less than 10 m) of the source element 306. Point 316 represents the geometrical center of the sources of the source 300, where $\vec{x}_s$ represents the Cartesian coordinates $(x_s, y_s, z_s)$ of the geometrical center of the source elements of the source 300. The sub-arrays 301-304 are connected by cables 318-320, and each sub-array may include a steering device, such as a wing, that may be used to separately steer and control the direction the sub-array travels while being towed through the body of water. For example, the sub-array 302 includes a wing 322 that may be used to control the lateral direction of the sub-array 302.

As explained above, the reflected wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques in order to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather.

Figure 4:
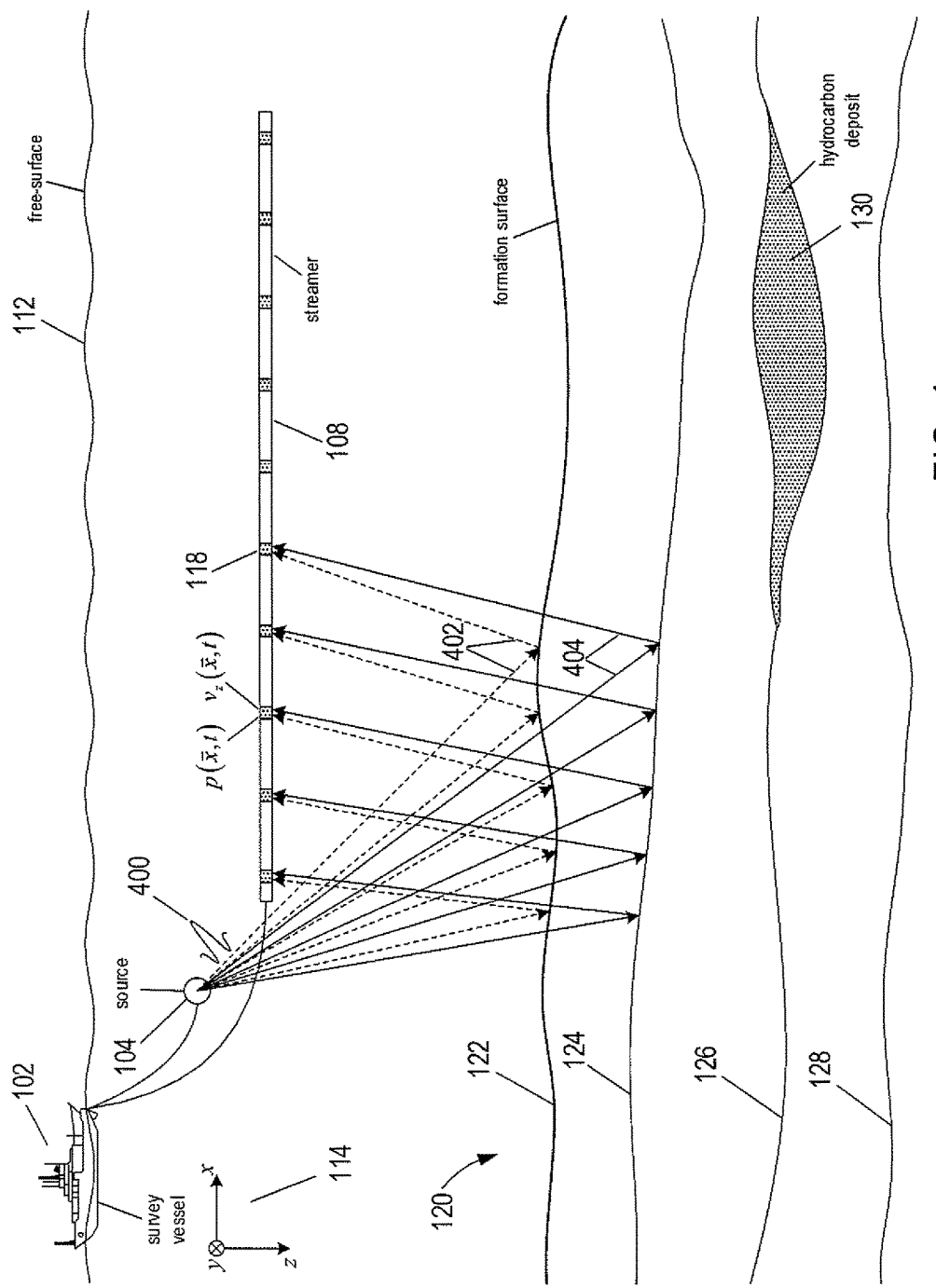
FIG. 4 shows example ray paths of an acoustic signal that travels from a source to surfaces of a subterranean formation.

FIG. 4 shows example ray paths of an acoustic signal 400 that travels from the source 104 into the subterranean formation 120. Dashed-line rays, such as rays 402, represent acoustic energy reflected from the formation surface 122 to receivers 118 located along the streamer 108, and solid-line rays, such as rays 404, represent acoustic energy reflected from the interface 124 to the receivers 118 located along the streamer 108. Note that for simplicity of illustration a small number of ray paths are represented. In the example of FIG. 4, the particle motion sensors located at each receiver 118 measures vertical particle velocity of the wavefield emanating from the subterranean formation 120 in response to the acoustic signal 400. The pressure data and vertical velocity data generated at each receiver 118 may be time sampled and recorded as separate traces. In the example of FIG. 4, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 5:
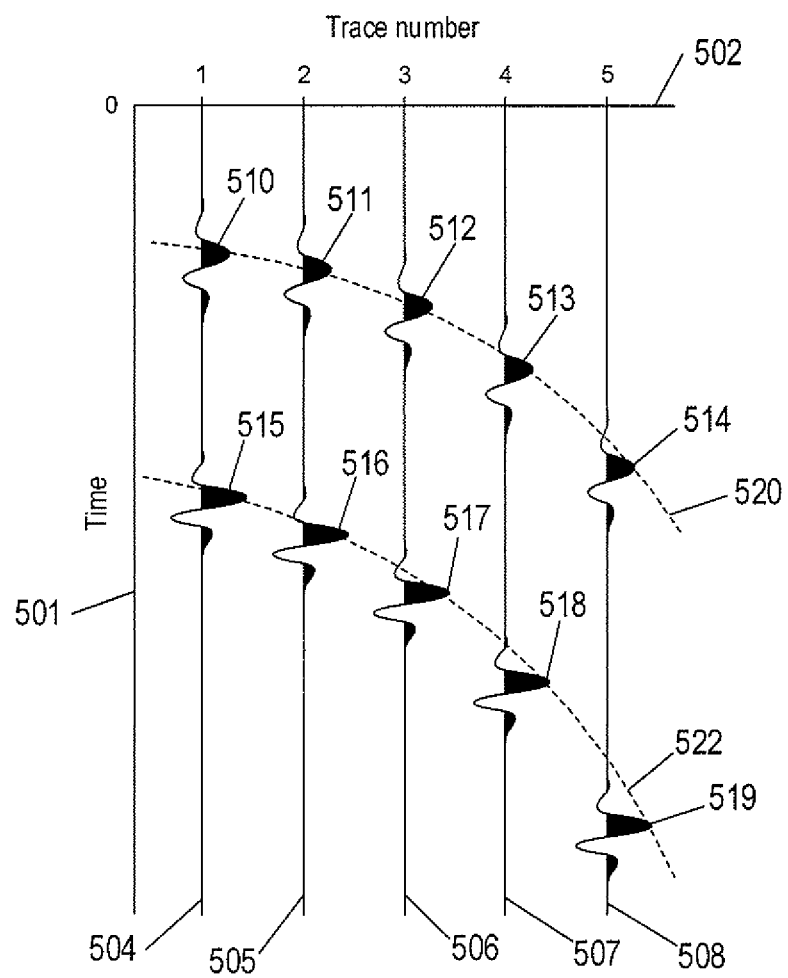
FIG. 5 shows a common-shot gather of a reflected wavefield measured by five adjacent receivers located along a streamer.

FIG. 5 shows a common-shot gather of five example traces of a reflected wavefield measured by five adjacent receivers located along the streamer 108 shown in FIG. 4. Vertical axis 501 represents time. Horizontal axis 502 represents trace numbers with trace "1" representing the seismic data generated by the receiver 118 located closest to the source 104 and trace "5" representing the seismic data generated by the receiver 118 located farther away from the source 104. The traces 504-508 may represent variation in the amplitude of either the pressure data or the particle motion data measured by corresponding sensors of the five receivers 118. The example traces include wavelets or pulses 510-519 that represent the portion of the wavefield reflected from the formation surface 122 and interface 124 of the subterranean formation measured by the pressure sensors or particle motion sensors. Peaks, colored black, and troughs of each trace represent changes in the amplitude. The distances along the traces 504-508 from time zero to the wavelets 510-514 represent two-way travel times of the acoustic energy output from the source 104 to the formation surface 122 and to the receivers 118 located along the streamer 108. Wavelets 515-519 represent longer two-way travel times of the acoustic energy output from the source 104 to the interface 124 and to the same receivers 118 located along the streamer 108. The amplitude of the peak or trough of the wavelets 510-519 indicates the magnitude of the reflected acoustic energy recorded by the receivers 118.

The arrival times versus source-receiver offset is generally longer with increasing source-receiver offset. As a result, the wavelets that correspond a formation surface, or a subterranean interface, are collectively called a "reflected wave" that tracks a curve. For example, curve 520 represents the distribution of the wavelets 510-514 reflected from the formation surface 122, which is called a formation-surface reflected wave, and curve 522 represents the distribution of the wavelets 515-419 from the interface 124, which is called an interface reflected wave.

Ideally, the acoustic energy output from the source 104 travels directly from the source 104 to the subterranean formation 120 and is reflected back to the receivers 118 as shown in FIG. 4. In practice, the acoustic energy spreads out radially from the source 104, as described above with reference to FIG. 1A, and because the free surface of a body of water reflects acoustic energy, "ghost" effects created by free-surface reflections contaminate seismic data generated by the receivers. The ghost effects result from portions of the acoustic energy reverberating between the free surface 112 and the surfaces and interfaces of the subterranean formation 120. As a result, the receivers 118 measure not only portions of the reflected wavefields that travel directly from the subterranean formation 120 to the receivers 118 but also measure wavefields that travel directly from the source to the receivers and time-delayed (i.e., ghost) wavefields created by one or more reflections of acoustic energy from the free surface 112.

Figure 6:
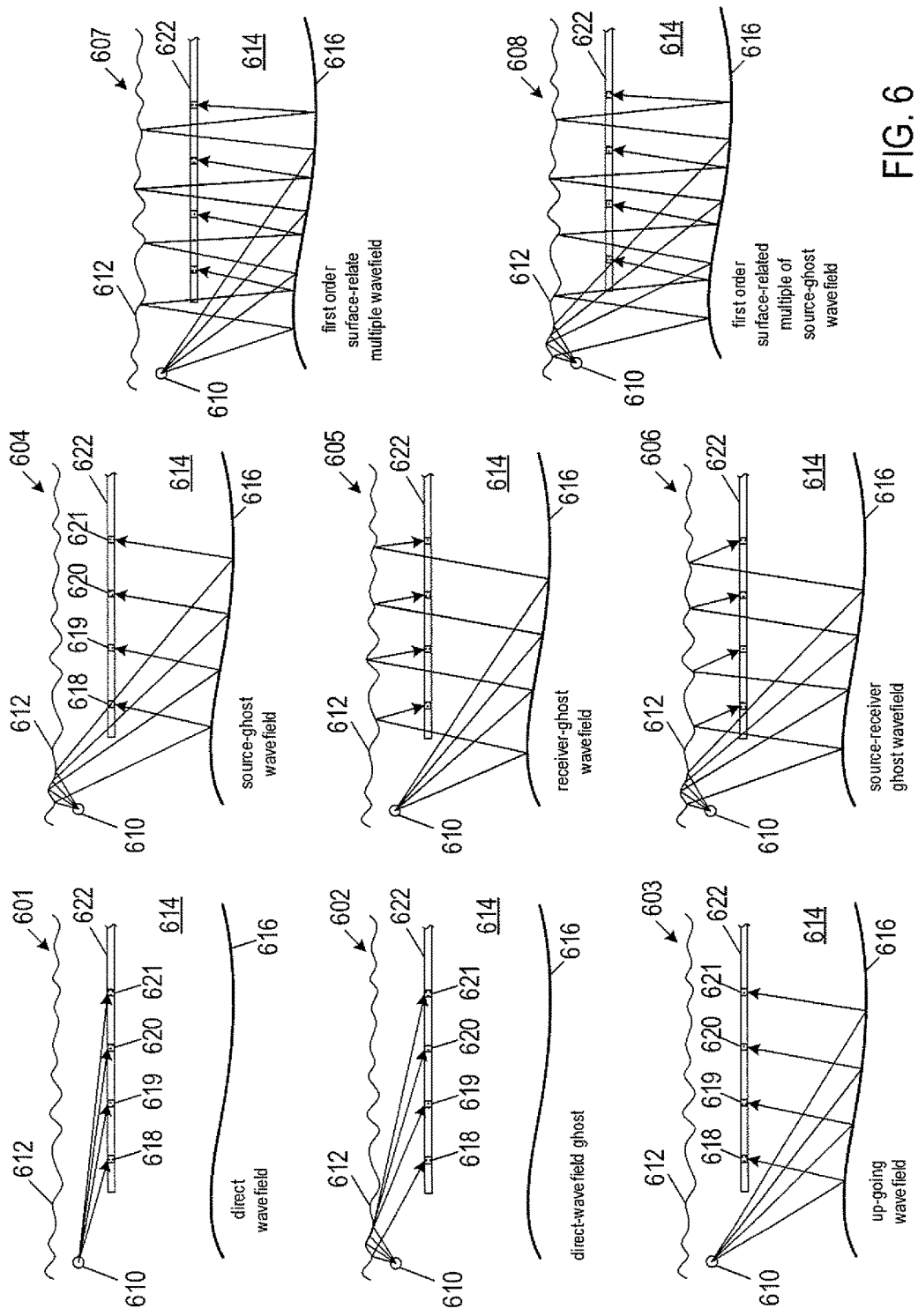
FIG. 6 shows eight events that represent different ways in which acoustic energy of an acoustic signal may be reflected between a free surface of a body of water and a surface of a subterranean formation before reaching receivers of a streamer.

FIG. 6 shows events 601-608 that represent different ways in which acoustic energy created from a single activation of a source 610 may be reflected between a free surface 612 of a body of water 614 and a surface (or interface) 616 of a subterranean formation before reaching receivers 618-621 of a streamer 622. Directional arrows in each event represents the path a portion of the acoustic energy travels from the source 610 to the receivers 618-621. Event 601 represents a portion of the acoustic energy that travels directly from the source 610 to the receivers 618-621 and is called a "direct wavefield." Event 602 represents a portion of the acoustic energy that is reflected from the free surface 612 before reaching the receivers 618-621 and is called a "direct-wavefield ghost." Event 603 represents a portion of the acoustic energy that is reflected from the surface 616 to the receivers 618-621 and is called an "up-going wavefield." Event 604 represents a portion of the acoustic energy that is reflected from the free surface 612 then the surface 616 before reaching the receivers 618-621 and is called a "source-ghost wavefield." Event 605 represents a portion of the acoustic energy that is reflected from the surface 616 then the free surface 612 before reaching the receivers 618-621 and is called a "receiver-ghost wavefield." Event 606 represents a portion of the acoustic energy that is reflected twice from the free surface 612 and once from the surface 616 before reaching the receivers 618-621 and is called a "source-receiver ghost wavefield." Events 607 and 608 represent two types of first order surface-related multiples. Event 607 represents a portion of the acoustic energy reflected twice from the surface 616 and once from the free surface 612 before reaching the receivers 618-621 and is called a "first-order surface-related multiple wavefield." Event 608 represents a portion of the acoustic energy reflected twice from the surface 616 and twice from the free surface 612 before reaching the receivers 618-621 and is called a "first-order surface-related multiple of source-ghost wavefield." Higher order surface-related multiples that corresponded to numerous reflections between the free surface and surface and interfaces of the subterranean formation are not illustrated.

The pressure wavefield measured by the pressure sensors of the receivers may be represented as a sum of the different pressure wavefield components described above with reference to FIG. 6 as follows:

$$p(\vec{x}_r, t) = \\ p_D(\vec{x}_r, t) + p_{DSG}(\vec{x}_r, t) + p_{UP}(\vec{x}_r, t) + p_{SG}(\vec{x}_r, t) + p_{RG}(\vec{x}_r, t) + \\ p_{SRG}(\vec{x}_r, t) + p_{SM_1}(\vec{x}_r, t) + p_{SM_1-SG}(\vec{x}_r, t) + \text{higher order multiples} \quad (2)$$

where
$p_D(\vec{x}_r, t)$ is the direct pressure wavefield;
$p_{DSG}(\vec{x}_r, t)$ is direct-wavefield ghost;
$p_{UP}(\vec{x}_r, t)$ is the up-going pressure wavefield;
$p_{SG}(\vec{x}_r, t)$ is the source-ghost pressure wavefield;
$p_{RG}(\vec{x}_r, t)$ is the receiver-ghost pressure wavefield;
$p_{SRG}(\vec{x}_r, t)$ is the source-receiver ghost pressure wavefield;
$p_{SM_1}(\vec{x}_r, t)$ is the first-order surface-related multiple pressure wavefield; and $p_{SM_1-SG}(\vec{x}_r; t)$ is the first-order surface-related multiple source-ghost pressure wavefield.

The velocity vector wavefield measured by the particle motion sensors of the receivers may be represented as a sum of the different velocity vector wavefield components described above with reference to FIG. 6 as follows:

$$v_{\vec{n}}(\vec{x}_r, t) = v_{\vec{n},D}(\vec{x}_r, t) + v_{\vec{n},DSG}(\vec{x}_r, t) + \\ v_{\vec{n},UP}(\vec{x}_r, t) + v_{\vec{n},SG}(\vec{x}_r, t) + v_{\vec{n},RG}(\vec{x}_r, t) + v_{\vec{n},SRG}(\vec{x}_r, t) + \\ v_{\vec{n},SM_1}(\vec{x}_r, t) + v_{\vec{n},SM_1-SG}(\vec{x}_r, t) + \text{higher order multiples} \quad (3)$$

where $v v_{\vec{n},D}(\vec{x}_r, t)$ is the direct velocity wavefield;

$v v_{\vec{n},DSG}(\vec{x}_r, t)$ is direct velocity wavefield ghost;

$v v_{\vec{n},UP}(\vec{x}_r, t)$ is the up-going velocity wavefield;

$v v_{\vec{n},SG}(\vec{x}_r, t)$ is the source-ghost velocity wavefield;

$v v_{\vec{n},RG}(\vec{x}_r, t)$ is the receiver-ghost velocity wavefield;

$v v_{\vec{n},SRG_1}(\vec{x}_r, t)$ is the source-receiver ghost velocity wavefield;

$v v_{\vec{n},SM_1}(\vec{x}_r, t)$ is the first-order surface-related multiple velocity wavefield; and $v v_{\vec{n},SM_1-SG}(\vec{x}_r, t)$ is the first-order surface-related multiple source-ghost velocity wavefield.

Computing Synthetic Seismic Data in a Space and Time-Varying Model Environment Methods compute synthetic seismic data for a model environment that includes the effects of a time-varying free surface. The model environment comprises a model subterranean formation located below a model body of water. The model environment is separated into a stationary region and a time-varying region. The stationary region includes the model subterranean formation and a lower portion of the model body of water. The time-varying region includes an upper portion of the model body water and a time-varying free surface that approximates the state of an actual time-varying free surface of a body of water.

Methods compute a synthetic pressure wavefield for the model environment given by $$P_{syn} = P_{DR} + P_{UP} + P_{SG} + P_{RG} + P_{SRG} + P_{SM_1} + P_{SM_1-SG} \quad (4a)$$

where $P_{DR} = P_D + P_{DSG}$ is a synthetic direct pressure wavefield with ghost;

$P_{UP}$ is a synthetic up-going pressure wavefield;

$P_{SG}$ is a synthetic source-ghost pressure wavefield;

$P_{RG}$ is a synthetic receiver-ghost pressure wavefield;

$P_{SRG}$ is a synthetic source-receiver ghost pressure wavefield;

$P_{SM_1}$ is a synthetic first-order surface-related multiple pressure wavefield; and $P_{SM_1-SG}$ is a synthetic first-order surface-related multiple source-ghost pressure wavefield.

Each of the synthetic pressure wavefield components $P_{DR}$, $P_{UP}$, $P_{SG}$, $P_{RG}$, $P_{SRG}$, $P_{SM_1}$, and $P_{SM_1-SG}$ is computed separately as described below using the same model environment and are combined according to Equation (4a) to obtain the synthetic pressure wavefield. Each of the synthetic pressured wavefields components may be used to compute a corresponding synthetic velocity vector wavefield component, which are combined to give a synthetic velocity vector wavefield represented by $$\vec{V}_{syn} = \vec{V}_{DR} + \vec{V}_{UP} + \vec{V}_{SG} + \vec{V}_{RG} + \vec{V}_{SRG} + \vec{V}_{SM_1} + \vec{V}_{SM_1-SG} \quad (4b)$$

where $\vec{V}_{DR} = \vec{V}_D + \vec{V}_{DSG}$ is a synthetic direct velocity vector wavefield with ghost;

$\vec{V}_{UP}$ is a synthetic up-going velocity vector wavefield;

$\vec{V}_{SG}$ is a synthetic source-ghost velocity vector wavefield;

$\vec{V}_{RG}$ is a synthetic receiver-ghost velocity vector wavefield;

$\vec{V}_{SRG}$ is a synthetic source-receiver ghost velocity vector wavefield;

$\vec{V}_{SM_1}$ is a synthetic first-order surface-related multiple velocity vector wavefield; and $\vec{V}_{SM_1-SG}$ is a synthetic first-order surface-related multiple source-ghost velocity vector wavefield.

The synthetic pressure wavefield components of Equation (4a) are computed based on one or more of a subsurface reflectivity, $P_{sub}$, a free-surface reflectivity, $P_{fs}$, an incident wavefield, $P_{inc}$, and a source-side scattered wavefield, $P_{scat}$. The subsurface reflectivity, free-surface reflectivity, incident wavefield, and source-side scattered wavefield are also computed for the same model environment.

Figure 7A:
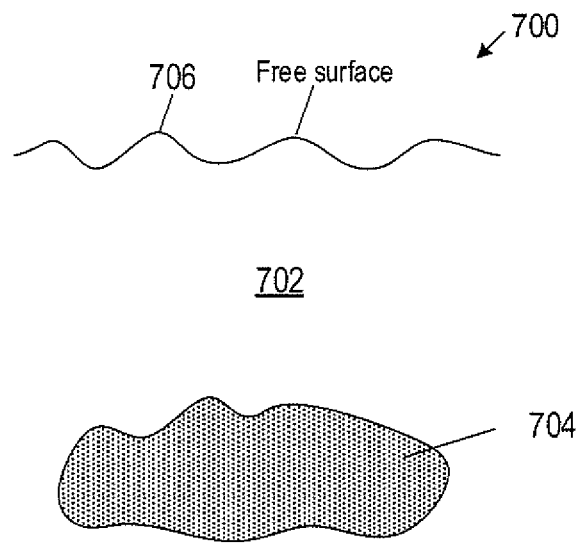
FIG. 7A shows a model environment comprising a model body of water and a subterranean formation.
Figure 7B:
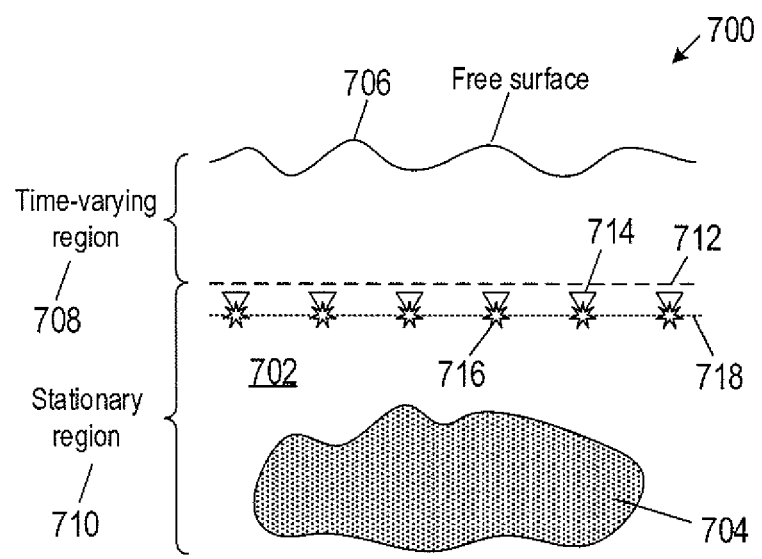
FIG. 7B shows a model environment separated into a time-varying region and a stationary region.

FIG. 7A shows an example model environment 700 comprising a model body of water 702 and a shaded object 704 that represents a subterranean formation. Curve 706 represent a time-varying free surface of the model body of water 702. FIG. 7B shows the model environment 700 separated into a time-varying region 708 and a stationary region 710. A dashed line 712 located within the model body of water 702 represents a boundary that separates the time-varying region 708 and the stationary region 710. Triangles located below the boundary 712 within the stationary region 710, such as triangle 714, represent virtual receivers. Stars located below the boundary 712 within the stationary region 710, such as star 716, represent virtual sources. In the example of FIG. 7B, the virtual receivers and the virtual sources are located along a flat separation level represented by a dotted line 718 within the stationary region 710 and below the boundary 712. The coordinates of the virtual sources or virtual receivers at the separation level 718 are denoted by a vector $\vec{x}_{sep}$. In the following discussion, pressure wavefields from the time-varying region 708 and the stationary region 710 are computed using the virtual sources and virtual receivers located at the separation level 718. The computed seismic data from the time-varying region 708 and stationary region 710 of the model environment 700 at the separation level 718 are combined as described below using acoustic reciprocity to compute synthetic pressure and velocity vector wavefields from sources to receiver locations. Note that in the following discussion the separation level 718 is shown as a planar or flat. Methods are not limited to a planar separation level 718. The separation level may also have a smooth varying shape.

Subsurface Reflectivity

Figure 8:
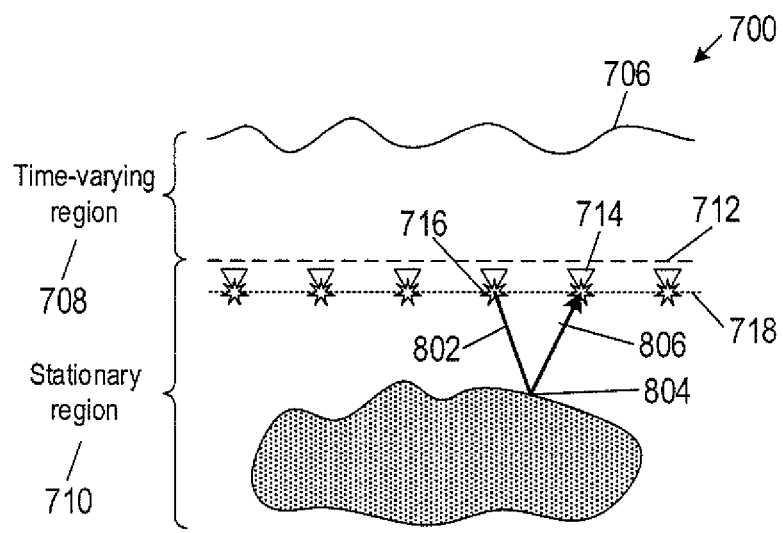
FIG. 8 shows an acquisition geometry to determine subsurface reflectivity of a subterranean formation.

The subsurface reflectivity, $P_{sub}$, is a model of pressure wavefield reflections from a subsurface of the subterranean formation 704 in the stationary region 710. FIG. 8 shows an acquisition geometry to determine the subsurface reflectivity, $P_{sub}$, of the subterranean formation 704 in the stationary region 710 of the model environment 700. A ray 802 represents a path of an acoustic signal generated by the virtual source 716 to a subsurface reflector 804 of the subterranean formation 704. A ray 806 represents a path of an acoustic reflection from the subsurface reflector 804 to the virtual receiver 714. The rays 802 and 806 are a ray path from the source 716 to the subsurface reflector 804 then to the virtual receiver 714. The acoustic signal generated by the virtual source 716 in the stationary region 710 may be a virtual source wavelet represented by a band-limited spike:

$$s^{st}(t^{st} - \tau_s^{sepsub}) \delta(\vec{x} - \vec{x}_{sep}) \qquad (5)$$

where $s^{st}$ is the strength or magnitude of the acoustic signal output from the virtual source 716;

$\tau_s^{sepsub}$ is the time when the acoustic signal is released from the virtual source 716 at the separation level to generate the subsurface reflectivity and is called the "subsurface reflectivity shooting time at the separation level";

$t^{st}$ is the local time axis in the stationary region of the model environment; and $$\delta(\vec{x} - \vec{x}_{sep}) = \begin{cases} 1 & \text{for } \vec{x} = \vec{x}_{sep} \\ 0 & \text{for } \vec{x} \neq \vec{x}_{sep} \end{cases}.$$

The subsurface reflectivity of an acoustic signal that travels the ray path shown in FIG. 8 may be computed using ray tracing or a finite difference ("FD") method applied to the band-limited spike given by Equation (5). The resulting subsurface reflectivity is denoted by:

$$P_{sub}(\vec{x}_{sep}, t^{st} | \vec{x}_{sep}, \tau_s^{sepsub}) \qquad (6)$$

Note that computing the subsurface reflectivity of Equation (6) does not include the time-varying region 708 and the subsurface reflectivity is up-going at the separation level 718.

Free-Surface Reflectivity

Figure 9:
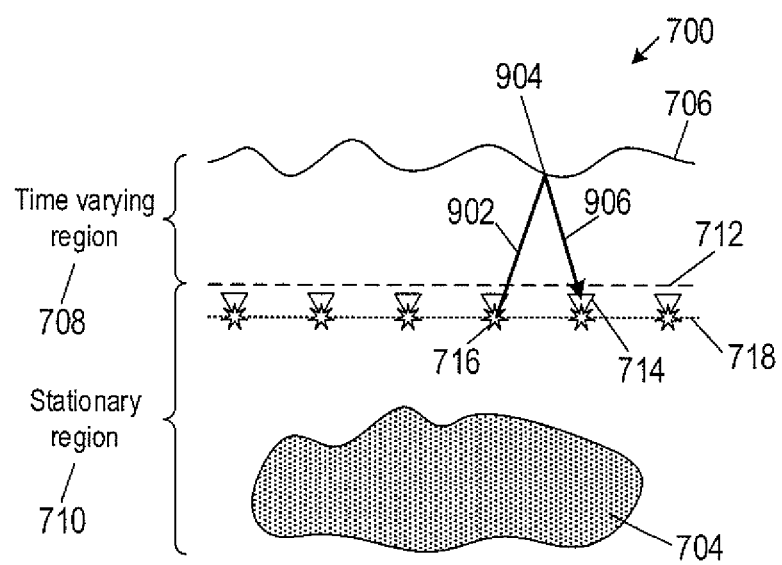
FIG. 9 shows an acquisition geometry to determine free-surface reflectivity of a free surface of a model body of water.

The free-surface reflectivity, $P_{fs}$, is a model of pressure wavefield reflections from the time-varying free surface 706 of the body of water 702 in time-varying region 708. FIG. 9 shows an acquisition geometry to determine the free-surface reflectivity, $P_{fs}$, of the time-varying free surface 706 in the time-varying region 708 of the model environment 700. Computation of the free-surface reflectivity depends on the type of variation occurring within the time-varying region 708. For example, the free-surface reflectivity, $P_{fs}$, may be computed for a realistic time-varying free surface 706. A ray 902 represents a path of an acoustic signal generated by the virtual source 716 to a free-surface reflector 904 on the time-varying free surface 706. A ray 906 represents a path of an acoustic reflection front the free-surface reflector 904 to the virtual receiver 714. The rays 902 and 906 are a ray path from the source 716 to the free-surface reflector 904 then to the receiver 714. The acoustic signal generated by the virtual source 716 in the time-varying region 708 is a virtual source wavelet represented by a band-limited spike:

$$s^{tv}(t^{tv} - \tau_s^{sepfs}) \delta(\vec{x} - \vec{x}_{sep}) \qquad (7)$$

where $s^{tv}$ is the strength or magnitude of the acoustic signal output from the virtual source 716 in the time-varying region 708;

$\tau_s^{sepfs}$ is the time when the acoustic signal is released from the virtual source 716 at the separation level to generate the free-surface reflectivity and is called the "free-surface reflectivity shooting time at the separation level"; and $t^{tv}$ is the local time axis in the time-varying region of the model environment.

The free-surface reflectivity resulting from an acoustic signal that travels along the model ray path shown in FIG. 9 is denoted by:

$$P_{fs}(\vec{x}_{sep}, t^{tv} | \vec{x}_{sep}, \tau_s^{sepfs}) \qquad (8)$$

Note that the free-surface reflectivity of Equation (8) does not include the stationary region 710 of the model environment 700 and the contributions to the free-surface reflectivity are down-going at the separation level 718. The free-surface reflectivity may be computed by applying acoustic reciprocity to a scattered wavefield from the time-varying free surface 706 as follows.

Figure 10:
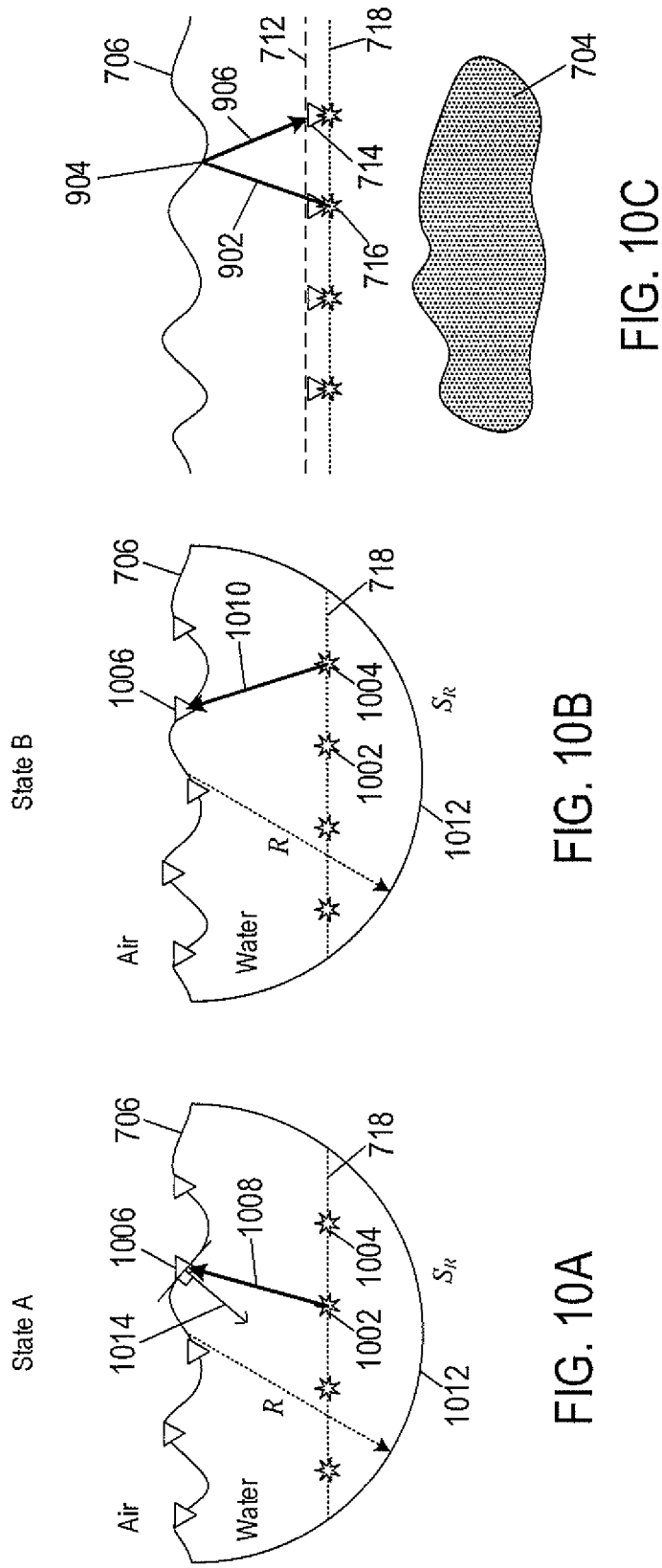
FIGS. 10A-10C shows states that are coupled together to compute a free-surface reflectivity.

FIGS. 10A-10B shows two states A and B that are coupled together to obtain an equation for computing the free-surface reflectivity. FIGS. 10A and 10B show the time-varying free surface 706 and virtual sources, such as virtual sources 1002 and 1004, located at the separation level 718. Virtual receivers, such as virtual receiver 1006, are located at points along the time-varying free surface 706. FIG. 10A shows a state A in which the virtual source 1002 generates an acoustic signal represented by a virtual source wavelet $s^A(t^A - \tau_s^{sepfs}) \delta(\vec{x} - \vec{x}_{sep})$ that reaches the virtual receiver 1006 as represented by a ray 1008, where $s^A$ is the strength of the acoustic signal and $t^A$ is the local time axis in the state A. Note that the time in the state A is forward time. For all later calculations, $\tau_s^{sepfs} = 0$ (i.e., the shooting time is synchronized with the free-surface time). FIG. 10B shows a state B in which the virtual source 1004 generates an acoustic signal represented by a virtual source wavelet $s^B(t^B - \tau_s^B) \delta(\vec{x} - \vec{x}_{sep})$ that reaches the same virtual receiver 1006 as represented by a ray 1010, where $s^B$ is the strength of the acoustic signal, $t^B$ is the local time axis in the state B and $\tau_s^B$ is the shooting time in state B. By contrast, time in the state B is backward time. The time-varying free surface 706 is a hypothetical time-varying surface (i.e., not a physical boundary) with coordinates along the time-varying free surface 706 denoted by $\vec{x}_{fs}$. The time-varying free surface 706 in the state A is a physical boundary that delineates the separation between water and air or vacuum. In order to couple the states A and B using acoustic reciprocity, the states A and B are enclosed by the same volume V with a surface defined by a hemispherical cup surface 1012 $S_R$ having a radius of R and the time-varying free surface 706. The time-varying free surface 706 may be characterized by a time-dependent free surface function $S_{fs}(t)$. As a result, the volume V also time varying within a volume surface $S(t) = S_R + S_{fs}(t)$. The computations described below are executed with a time-dependent free surface function $S_{fs}(t)$.

In one embodiment, the time-dependent free surface function $S_{fs}(t)$ may be computed from separated wavefield imaging of the time-varying free surface using actual pressure and velocity wavefields obtained in a marine seismic survey. In another embodiment, the time-dependent free surface function $S_{fs}(t)$ may be computed using a time-varying Pierson-Moskowitz free surface function given by:

$$S_{fs}(t) = S_{fs}(x_{fs}, t) = \frac{1}{L} \sum_{q=-N/2}^{N/2-1} F(K_q) e^{i(k_q x_{fs} - \omega_q t)} \qquad (9)$$

where t is time;

$k_q$ is a wavenumber;

$\omega_q$ is an angular frequency;
L is the length of the time-varying free surface;

$$F(K_q) = \sqrt{2\pi L W(K_q)} \begin{cases} [N(0,1) + jN(0,1)]/\sqrt{2} & \text{for } q \neq 0, N/2 \\ N(0,1) & \text{for } q = 0, N/2 \end{cases},$$

and $N(0,1)$ is a random number generated from a Gaussian distribution having zero mean and a unit variance.

Note that the wavenumber $k_q$ and the angular frequency $\omega_q$ are related to each other by the dispersion relations. For deep water, $\omega_q^2 = g|k_q|$. For shallow water, $\omega_q^2 = g|k_q|\tan h(k_q H)$, where H is the height of the water column. For $q<0$, $F(K_q) = F(K_{-q})^*$. The parameter $W(K_q)$ is the Pierson-Moskowitz spatial roughness spectrum, which for a fully developed free surface is given by:

$$W(K_q) = \left[\frac{\alpha}{4|K_q|^3}\right] \exp(-\beta g^2/K_q^2 U_w^4)$$

where
$K_q$ is the spatial wavenumber;
$U_w$ is the wind speed measured above the level of the time-varying free surface (e.g., about 18 to 20 meters above the level of an actual free surface of a body of water);
$\alpha$ is $8.0 \times 10^{-3}$;
$\beta$ is 0.74; and
g is the acceleration due to gravity.

The wind speed, $U_w$, is a measured quantity that may be obtained during a marine seismic survey. The spatial wavenumber may be given by $K_q = 2\pi q/L$. The time-varying free surface is formed by adding each wavenumber component imposing random phase shifts.

Using volumes and surfaces that are the same for the states A and B, acoustic reciprocity may be used to couple the states A and B as follows:

$$\int_{\tau_{min}^A}^{\tau_{max}^A} \int_{V(t^A)} \{I_1 + I_2\} dV(t^A) dt^A = \int_{\tau_{min}^A}^{\tau_{max}^A} \int_{S_{fs}(t^A)} \{I_3\} dS_{fs}(t^A) dt^A \quad (10)$$

where $I_1 = p^A(\vec{x}, t^A | \vec{x}_{sep}, 0) s^B(t^B - \tau_s^B) \delta(\vec{x} - \vec{x}_{sep}) -$
$\qquad p^B(\vec{x}, t^B | \vec{x}_{sep}, \tau_s^B) s^A(t^A - 0) \delta(\vec{x} - \vec{x}_{sep});$ $I_2 = \frac{1}{c(\vec{x})^2} \left[ p^A(\vec{x}, t^A | \vec{x}_{sep}, 0) \frac{\partial^2 p^B(\vec{x}, t^B | \vec{x}_{sep}, \tau_s^B)}{\partial t^{B2}} - \right.$
$\qquad \left. p^B(\vec{x}, t^B | \vec{x}_{sep}, \tau_s^B) \frac{\partial^2 p^A(\vec{x}, t^A | \vec{x}_{sep}, 0)}{\partial t^{A2}} \right];$ and $I_3 = \left[ p^A(\vec{x}_{fs}, t^A | \vec{x}_{sep}, 0) \frac{\partial p^B(\vec{x}_{fs}, t^B | \vec{x}_{sep}, \tau_s^B)}{\partial \vec{n}(t^A)} \right] -$
$\qquad \left[ p^B(\vec{x}_{fs}, t^B | \vec{x}_{sep}, \tau_s^B) \frac{\partial p^A(\vec{x}_{fs}, t^A | \vec{x}_{sep}, 0)}{\partial \vec{n}(t^A)} \right]$ The pressure wavefields in the integrand parameters $I_1$, $I_2$, and $I_3$ of Equation (10) are defined as follows:

$p^A(\vec{x}, t^A | \vec{x}_{sep}, 0)$ is the pressure wavefield that travels from a point in the separation level $\vec{x}_{sep}$ to any point $\vec{x}$ in the state A;

$p^A(\vec{x}_{fs}, t^A | \vec{x}_{sep}, 0)$ is the pressure wavefield that travels from a point in the separation level $\vec{x}_{sep}$ to a point on the time-varying free surface $\vec{x}_{fs}$ in the state A;

$p^B(\vec{x}_{fs}, t^B | \vec{x}_{sep}, \tau_s^B)$ is the pressure wavefield that travels from a point in the separation level $\vec{x}_{sep}$ to any point $\vec{x}$ in the state B;

$p^B(\vec{x}_{fs}, t^B | \vec{x}_{sep}, \tau_s^B)$ is the pressure wavefield that travels from a point in the separation level $\vec{x}_{sep}$ to a point on the time-varying free surface $\vec{x}_{fs}$ in the state A;

$c(\vec{x})$ is the speed of sound in the body of water at the point $\vec{x}$;

$\vec{n}$ is the outward pointing unit normal vector from the time-varying free surface 706; and $t^A \in (\tau_{min}^A, \tau_{max}^A)$.

Note that the pressure wavefield $p^B(\vec{x}, t^B | \vec{x}_{sep}, \tau_s^B)$ is propagating backward in time. In Equation (10), the volumes in the states A and B are identical at any point in space and time. As a result, the time-varying free surfaces in the states A and B vary in the same way and are represented by $S_{fs}(\tau_r^A) = S_{fs}(\tau_r^B)$, where $\tau_r^A$ is the time it takes for a wavefield generated at the virtual source in state A to reach the time-varying free surface and $\tau_r^B$ is the time it takes for a wavefield generated at the virtual source in state B to reach the same free surface. The body of water enclosed by the surface S in the states A and B are the same. The radius R is allowed to approach infinity and Sommerfeld radiation condition is applied over the hemispherical cup surface $S_R$. The pressure wavefield in state A at the time-varying free surface 706 is zero (i.e., in the state A, the time-varying free surface is a physical boundary). The application of a causality condition results in $I_2 = 0$. Applying source-receiver reciprocity in state B results in $p^B(\vec{x}_{fs}, t^B | \vec{x}_{sep}, \tau_s^B) = p^B(\vec{x}_{sep}, t^B - \tau_s^B | \vec{x}_{fs}, 0)$ and time in the state B becomes forward time. Finally, substituting the time axis relation $t^{tv} = t^A + (t^B - \tau_s^B)$ reduces Equation (10) to $$s^B(t^{tv}) p^A(\vec{x}_{sep}, t^{tv} | \vec{x}_{sep}, 0) - p^B(\vec{x}_{sep}, t^{tv} | \vec{x}_{sep}, 0) * s^A(t^{tv}) = \quad (11)$$

$$-\int_{\tau_{min}^A}^{\tau_{max}^A} \int_{S_{fs}(t^A)} \{I_4\} dS_{fs}(t^A) dt^A$$

where $I_4 = p^B(\vec{x}_{sep}, t^{tv} - t^A | \vec{x}_{fs}, 0) \frac{\partial p^A(\vec{x}_{fs}, t^A | \vec{x}_{sep}, 0)}{\partial \vec{n}(t^A)};$ and "*" is the convolution operator.

Note that after the application of source-receiver reciprocity to the state B, the time is forward time, the virtual sources are at the time-varying free surface, and the virtual receivers are at the separation level. The first and second terms on the left-hand side of Equation (11) represent the synthetic pressure wavefield and the direct wavefield, respectively. Because the synthetic pressure may be decomposed into scattered and direct wavefields and taking only the scattered wavefield contribution from Equation (11), the free-surface reflectivity is given by:

$$P_{fs}(\vec{x}_{sep}, t^{tv} | \vec{x}_{sep}, 0) = -\int_{\tau_{min}^A}^{\tau_{max}^A} \int_{S_{fs}(t^A)} \{I_4\} dS_{fs}(t^A) dt^A \quad (12)$$

FIG. 10C is a reproduction of FIG. 9. The ray 902 corresponds to the ray 1008 in the state A and the ray 906 is the inverse of the ray 1010 in the state B after source-receiver reciprocity. The free-surface reflector 904 corresponds to the virtual receiver 1006 located along the time-varying free surface 706 in the states A and B. The free-surface reflectivity $P_{fs}$ computed according to Equation (12) gives the reflectivity of the time-varying free surface 706.

In order to compute the free-surface reflectivity according to Equation (12), the pressure wavefield in the state B, $p^B(\vec{x}_{sep}, t^{tv}-t^A|\vec{x}_{fs}, 0)$, is computed using a Green's function of the time-varying region of the model environment and the source signature in the state B, which is a band-limited spike in FIG. 10B. Therefore, the pressure wavefield in the state B may be computed as follows:

$$p^B(\vec{x}_{sep}, t^{tv}-t^A|\vec{x}_{fs}, 0) = s^B(t^{tv}-t^A) * G^{tv}(\vec{x}_{sep}, t^{tv}-t^A|\vec{x}_{fs}, 0) \quad (13)$$

where $G^{tv}$ is a Green's function in the time-varying region of the model environment.

The Green's function represents the wavefield produced by a source function that is represented by Dirac delta function in space and time (i.e., impulse response).

The Green's function, $G^{tv}$, in Equation (13), and in the equations below, may be computed for a given medium using ray tracing or FD methods depending on the complexity of the time-varying region 708 of the model environment. The Green's function in a three-dimensional homogenous medium may be computed as follows:

$$G^{tv}(\vec{x}_{sep}, t^{tv}-t^A|\vec{x}_{fs}, 0) = \frac{\delta\left(t^{tv}-t^A-\frac{|\vec{x}_{fs}-\vec{x}_{sep}|}{C}\right)}{4\pi|\vec{x}_{fs}-\vec{x}_{sep}|} \quad (14a)$$

where $\delta(\cdot)$ is a delta function.

The Green's function in a two-dimensional homogenous medium may be computed as follows:

$$G^{tv}(\vec{x}_{sep}, t^{tv}-t^A|\vec{x}_{fs}, 0) = \frac{H\left(t^{tv}-t^A-\frac{|\vec{x}_{fs}-\vec{x}_{sep}|}{c}\right)}{2\pi\sqrt{(t^{tv}-t^A)^2-\left(\frac{|\vec{x}_{fs}-\vec{x}_{sep}|}{c}\right)^2}} \quad (14b)$$

where H is a Heaviside function given by $$H(\vec{x}) = \begin{cases} 0 & \text{for } \vec{x} < 0 \\ 1 & \text{for } \vec{x} \geq 0 \end{cases}$$

The normal derivative of the pressure wavefield at the time-varying free surface 706 in the integrand of Equation (11) is given by $$\frac{\partial p^A(\vec{x}_{fs}, t^A|\vec{x}_{sep}, 0)}{\partial \vec{n}(t^A)} = \vec{\nabla} p^A(\vec{x}_{fs}, t^A|\vec{x}_{sep}, 0) \cdot \vec{n}(t^A) \quad (15)$$

where $\vec{\nabla}$ is the gradient operator;

"·" is the dot or scalar product; and $\vec{n}(t^A)$ is an outward pointing time dependent unit normal vector at the time-varying free surface 716.

The normal derivative in Equation (15) is a directional derivative taken in the direction of the vector, $\vec{n}(t^A)$, which is a normal (i.e., orthogonal) vector to the time-varying free surface 706 as represented by directional arrow 1014 in FIG. 10A. The pressure gradient $\vec{\nabla} p^A(\vec{x}_{fs}, t^A|\vec{x}_{sep}, 0)$ in Equation (15) may be computed for all time samples of $t^A$, using a Kirchhoff approximation given by $$\vec{\nabla}_p{}^A(\vec{x}_{fs}, t^A|\vec{x}_{sep}, 0) \approx 2s^A(t^A) * \vec{\nabla} G^{tv}(\vec{x}_{fs}, t^A|\vec{x}_{sep}, 0)$$

or solving an integral inversion problem in the form of a Fredholm integral of either the first or second kind.

Incident Wavefield

Figure 11:
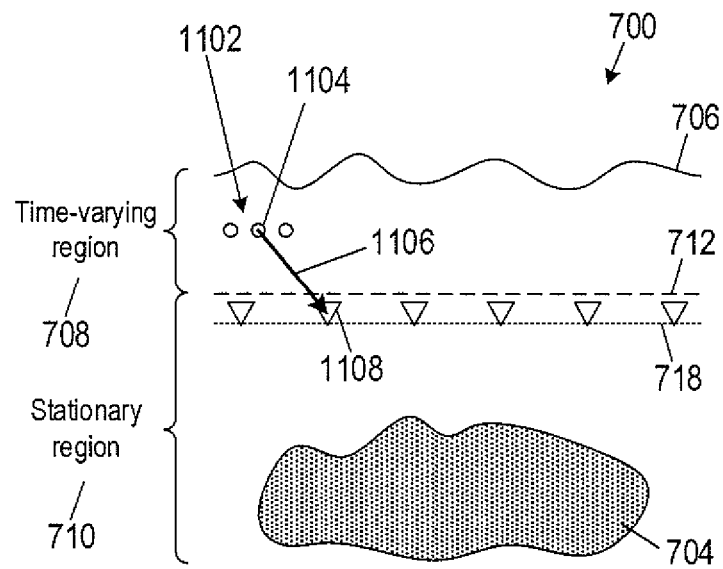
FIG. 11 shows an acquisition geometry to determine an incident wavefield.

The incident wavefield, $P_{inc}$, is a model of the pressure wavefield that travels from a source to the separation level and may be computed based on actual source signatures of source elements of an actual source as described above with reference to FIG. 3. The source is located within the time-varying region of the model environment 700. FIG. 11A shows the model environment 700 with a source 1102 located within the time-varying region 708 of the model environment 700. In the example of FIG. 11A, the source 1102 comprises three source elements represented by circles, such as source element 1104. Each of the source elements may be an air gun or a water gun submerged within a body of water as described above with reference to FIG. 3. Ray 1106 is the path of an acoustic signal output from the source element 1104 to a virtual receiver 1108 located at the separation level 718. The incident wavefield at the virtual receiver 1108 may be computed as a convolution between the Green's function in the time-varying region 708 and the notional source signatures of the source elements of the source 1102 as follows:

$$P_{inc}(\vec{x}_{sep}, t^{tv}|\vec{x}_s, \tau_s) = \sum_{i=1}^{N_s} S_i^{inc}(t^{tv}-\tau_{s_i}) * G^{tv}(\vec{x}_{sep}, t^{tv}-\tau_{s_i}|\vec{x}_{s_i}, 0) \quad (16)$$

where $N_s$ is the number of source elements comprising the source;

$\vec{x}_s$ is the geometrical center of the source;

$\tau_s$ is the shooting time (i.e., activation time) of the source;

$\vec{x}_{s_i}$ is the i-th source element coordinate;

$\tau_{s_i}$ is the i-th source element shooting time; and $S_i^{inc}$ is the strength of the notional source signature of the i-th source element.

In the computations below $\tau_{s_i}=0$ and $\tau_s=0$ (i.e., the shooting time is synchronized with the free-surface time). As a result, the incident pressure wavefield is represented by $P_{inc}(\vec{x}_{sep}, t^{tv}|\vec{x}_s, 0)$.

Source-Side Scattered Wavefield

Figure 12:
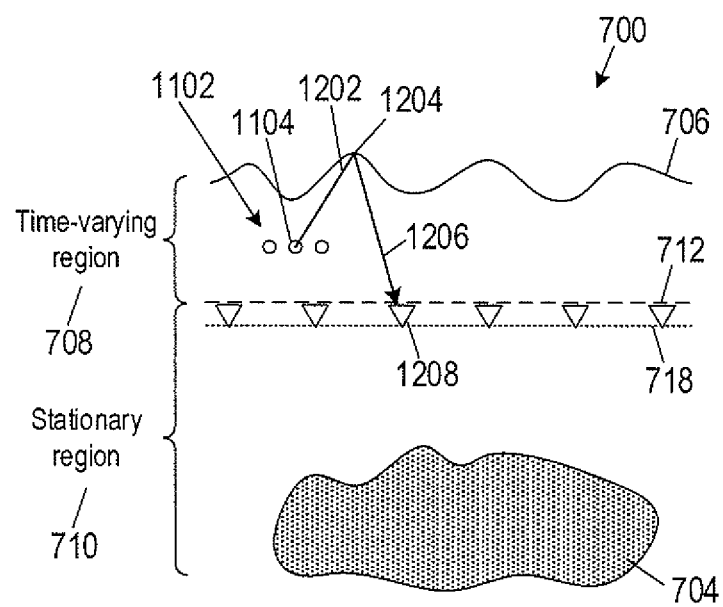
FIG. 12 shows an acquisition geometry to determine a source-side scattered wavefield.

The source-side scattered wavefield, $P_{scat}$, is a model of a pressure wavefield created by an acoustic signal that travels from the source to the time-varying free surface 706 and is reflectively scattered from the time-varying free surface 706. FIG. 12 shows the model environment 700 with the source 1102 located within the time-varying region 708 of the model environment 700. Ray 1202 represents the path of an acoustic signal output from the source element 1104 that travels to a free-surface reflector 1204 of the time-varying free surface 706. Ray 1206 represents the path of a reflection of the acoustic signal from the free-surface reflector 1204 to a virtual receiver 1208. The source-side scattered wavefield is computed using acoustic reciprocity.

Figure 13A:
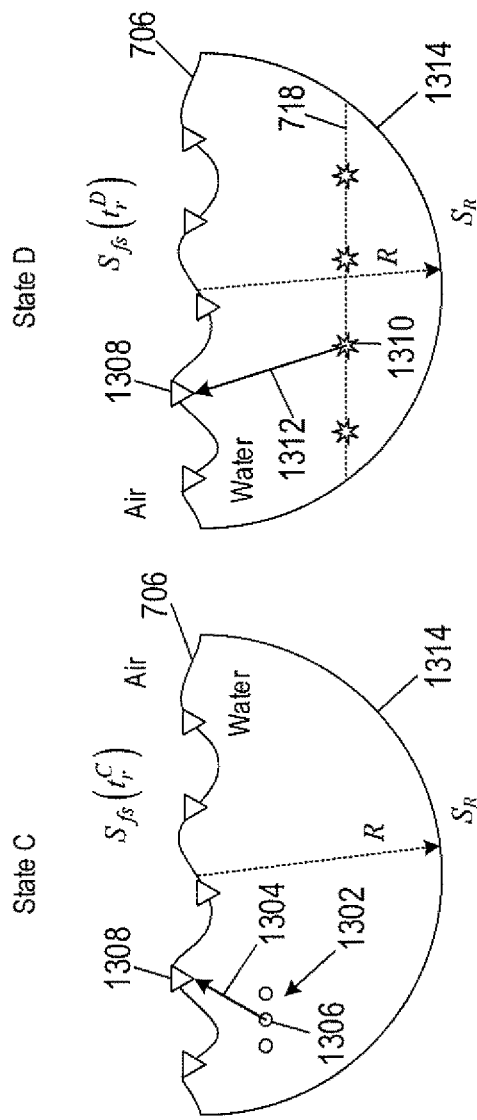
FIGS. 13A-13C shows states that are coupled together to compute a source-side scattered wavefield.
Figure 13B:
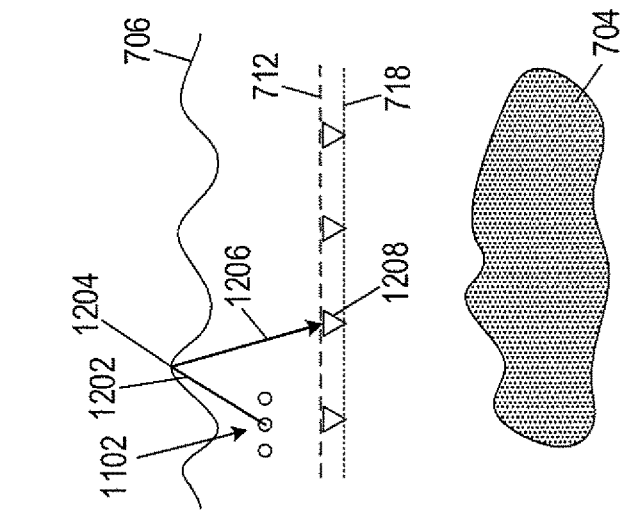

FIGS. 13A-13B show two states C and D, respectively, that are coupled together to compute the source-side scattered wavefield. FIG. 13A shows a state C in which acoustic signals generated by a source 1302 reach the virtual receivers located along the time-varying free surface 706. Ray 1304 represents an acoustic signal generated by a source element 1306 that reaches a virtual receiver 1308. FIG. 13B shows a state D in which a virtual source 1310 location along the separation level 718 generates an acoustic signal represented by a ray 1312 that reaches the same virtual receiver 1308. The acoustic signal in the state C is given by $$\sum_{i=1}^{N_s} S_i^{inc}(t^C)\delta(\vec{x}-\vec{x}_{s_i})$$

where $t^C$ is the local time axis in the state C.

The acoustic signal in state D is given by a virtual source wavelet $s^D(t^D-\tau_s^D)\delta(\vec{x}-\vec{x}_{sep})$, sep) where $s^D$ is the strength of the acoustic signal; $\tau_s^D$ is the shooting time in the state D; and $t^D$ is the local time axis in the state D. Time in the state D is backward time. In FIG. 13A-13B, a hemispherical cup surface 1314 $S_R$ with a radius of R and the time-varying free surface 706 form a closed surface $S(t)=S_R+S_{fs}(t)$, where the time-varying free surface 706 is characterized by the time-dependent free surface function $S_{fs}(t)$. The surfaces enclose the same volume V in the states C and D. The states C and D may be coupled using acoustic reciprocity as described above with reference to FIGS. 10A-10B and Equation (11). Replacing the time axis relation $t^{tv}=t^C+(t^D-\tau_s^D)$ gives the source-side scattered wavefield $$P_{scat}(\vec{x}_{sep}, t^{tv} | \vec{x}_s, 0) = -\int_{\tau_{min}^C}^{\tau_{max}^C}\int_{S_{fs}(t^C)} \{I_6\}dS_{fs}(t^C)dt^C \quad (17)$$

where $t^C \in (\tau_{min}^C, \tau_{max}^C)$; and $$I_6 = G^{tv}(\vec{x}_{sep}, t^{tv}-t^C | \vec{x}_{fs}, 0)\frac{\partial p^C(\vec{x}_{fs}, t^C | \vec{x}_s, 0)}{\partial \vec{n}(t^C)}$$

Figure 13C:
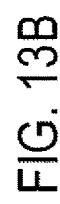

FIG. 13C shows the ray path of FIG. 12. The ray 1202 corresponds to the ray 1304 in the state C and the ray 1206 is the inverse of the ray 1312 in the state D after source-receiver reciprocity. The free-surface reflector 1204 corresponds to the virtual receiver 1308 located along the time-varying free surface 706 in the states C and D. The pressure wavefield in the state C may be computed using the incident wavefield of Equation (16) as follows:

$$p^C(\vec{x}_{fs}, t^C | \vec{x}_s, 0) = \sum_{i=1}^{N_s} S_i^{inc}(t^C) * G^{tv}(\vec{x}_{fs}, t^C | \vec{x}_{s_i}, 0) \quad (18)$$

The directional derivative of the pressure wavefield, $$\frac{\partial p^C(\vec{x}_{fs}, t^C | \vec{x}_s, 0)}{\partial \vec{n}(t^C)},$$

in Equation (17) may be computed for all time samples of $t^C$ using integral inversion of a Kirchhoff approximation given by $$\frac{\partial p^C(\vec{x}_{fs}, t^C | \vec{x}_s, 0)}{\partial \vec{n}(t^C)} = 2\sum_{i=1}^{N_s} S_i^{inc}(t^C) * \frac{\partial G^{tv}(\vec{x}_{fs}, t^C | \vec{x}_{s_i}, 0)}{\partial \vec{n}(t^C)}$$

Combinations of the subsurface reflectivity, $P_{sub}$, the free-surface reflectivity, $P_{fs}$, the incident wavefield, $P_{inc}$, and the source-side scattered wavefield, $P_{scat}$, described above are used to separately compute the synthetic pressure wavefield components of the synthetic pressure wavefield described above with reference to Equation (4a). The wavefields computed for the time-varying region 708 are combined with the wavefields computed from the stationary region 710 to obtain the synthetic pressure and velocity vector wavefield components as described below.

Computing the Synthetic Pressure and Velocity Vector Wavefield Components

Computing each of the synthetic pressure wavefield components of Equation (4a) includes computation of a normal derivative of a wavefield at the separation level, which is given, in general, by $$\frac{\partial W}{\partial \vec{n}(\vec{x}_{sep})} = \vec{\nabla} W \cdot \vec{n}(\vec{x}_{sep}) = \vec{\nabla} W \cdot \vec{n}_{sep} \quad (19)$$

where

W represents a synthetic pressure and velocity wavefield; and $\vec{n}(\vec{x}_{sep})=\vec{n}_p$ is the normal unit vector at a separation level coordinate $\vec{x}_{sep}$.

Figure 14A:
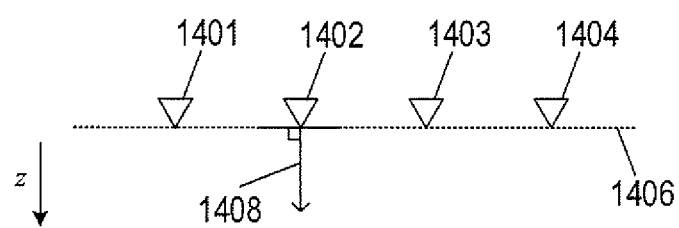
FIGS. 14A-14B show virtual receivers located along a planar separation level and a smoothly varying separation level.
Figure 14B:
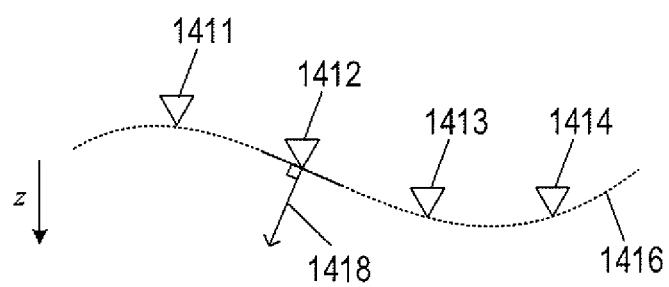

In certain implementations, the separation level may be a planar surface. FIG. 14A shows an example of four virtual receivers 1401-1404 located along a planar separation level represented by dotted line 1406. Directional arrow 1408 represents the direction of the normal vector $\vec{n}_{sep}$ to the separation level 1406, which is the same direction for each point $\vec{x}_{sep}$ on the planar separation level. In other implementations, the separation level may be a smooth varying surface. FIG. 14B shows an example of four virtual receivers 1411-1414 located along a smooth-varying separation level represented by a dotted curve 1416. Directional arrow 1418 represents the direction of the normal vector $\vec{n}_{sep}$ to the separation level 1416, which points in a different direction for different points $\vec{x}_{sep}$ on the smooth-varying separation level. When the separation level is planar and lies in the in xy-plane, the normal derivative reduces to a derivative in the z-direction (i.e., $\vec{n}_{sep}=(0,0,z)$) and may be computed in the Fourier domain by multiplying by $-ik_z$, where $k_z$ is the z-coordinate wavenumber.

Synthetic Direct Pressure and Velocity Vector Wavefields with Ghosts

A synthetic direct pressure wavefield with ghost is computed by extrapolating the incident wavefield obtained in Equation (16) and the source-side scattered wavefield obtained in Equation (17) from the virtual receiver at the separation level to a coordinate location of a receiver, $\vec{x}_r$, and finally adding the two results. The coordinate location of the receiver may be an actual coordinate location of a receiver described above with reference to Equation (1). When the separation level and the receiver level are not the same, the resulting wavefield is extrapolated from the separation level to the receiver level. Extrapolation of the incident wavefield to the coordinate location of the receiver may be performed using the Kirchhoff-Helmholtz integral in the space-frequency domain as follows:

$$\hat{P}_{inc}(\vec{x}_r, \omega | \vec{x}_s) = \int_{S_{sep}} \{I_7\} dS_{sep} \quad (20)$$

where $$I_7 = -\hat{G}^{tv*}(\vec{x}_r, \omega | \vec{x}_{sep}) \frac{\partial \hat{P}_{inc}(\vec{x}_{sep}, \omega | \vec{x}_s)}{\partial \vec{n}_{sep}} - $$

$$\hat{P}_{inc}(\vec{x}_{sep}, \omega | \vec{x}_s) \frac{\partial \hat{G}^{tv*}(\vec{x}_r, \omega | \vec{x}_{sep})}{\partial \vec{n}_{sep}}$$

"^" indicates the wavefield is in the space-frequency domain; and $\hat{G}^{tv*}$ is the complex conjugate of the Green's function in the time-varying region 708 of the model environment 700. The parameter $\vec{x}_s$ in Equation (20) is the coordinate location of a source, which may be an actual coordinate of the source described above with reference to Equation (1). Extrapolation of the source-side scattered wavefield to the coordinate location of the receiver may be performed using the Kirchhoff-Helmholtz integral in the space-frequency domain as follows:

$$\hat{P}_{scat}(\vec{x}_r, \omega | \vec{x}_s) = \int_{S_{sep}} \{I_8\} dS_{sep} \quad (21)$$

where $$I_8 = -\hat{G}^{tv*}(\vec{x}_r, \omega | \vec{x}_{sep}) \frac{\partial \hat{P}_{scat}(\vec{x}_{sep}, \omega | \vec{x}_s)}{\partial \vec{n}_{sep}} - $$

$$\hat{P}_{scat}(\vec{x}_{sep}, \omega | \vec{x}_s) \frac{\partial \hat{G}^{tv*}(\vec{x}_r, \omega | \vec{x}_{sep})}{\partial \vec{n}_{sep}}$$

The extrapolated incident wavefield of Equation (20) and the extrapolated source-side scattered wavefield of Equation (21) are transformed to the space-time domain using an inverse Fourier transform and summed to obtain a synthetic direct pressure wavefield with ghost at the coordinate location of the receiver:

$$P_{DR}(\vec{x}_r, t | \vec{x}_s, 0) = P_{inc}(\vec{x}_r, t | \vec{x}_s, 0) + P_{scat}(\vec{x}_r, t | \vec{x}_s, 0) \quad (22)$$

The synthetic direct pressure wavefield with ghost may also be written as $P_{DR}=P_D+P_{DSG}$, where $P_D$ is the direct pressure wavefield and $P_{DSG}$ is the direct pressure wavefield ghost.

A synthetic direct velocity vector wavefield with ghost may be computed from the synthetic direct pressure wavefield with ghost is given by:

$$\vec{V}_{DR}(\vec{x}_r, t | \vec{x}_s, 0) = -\frac{1}{\rho(\vec{x}_r)} \int_0^t \vec{\nabla} P_{DR}(\vec{x}_r, t' | \vec{x}_s, 0) dt' \quad (23)$$

where t represents a time greater than the shooting time of the source.

The gradient of the pressure wavefield $\vec{\nabla} P_{DR}$ in the integrand of Equation (23) may be computed using the finite difference method, where $P_{DR}$ is computed at two or more receiver depth levels above and below $\vec{x}_r$ and the gradient is computed by a central difference method. Alternatively, when the receiver level is flat, the gradient may be computed by transforming the pressure wavefield $P_{DR}$ to the Fourier domain and multiplying by $-ik_z$. The synthetic direct velocity vector wavefield with ghost may also be written as $\vec{v}_{DR}=\vec{v}_D+\vec{v}_{DSG}$, where $\vec{v}_D$ is the direct velocity vector wavefield and $\vec{v}_{DSG}$ is the direct velocity vector wavefield ghost.

Synthetic Up-Going Pressure and Velocity Vector Wavefields

Figure 15A:
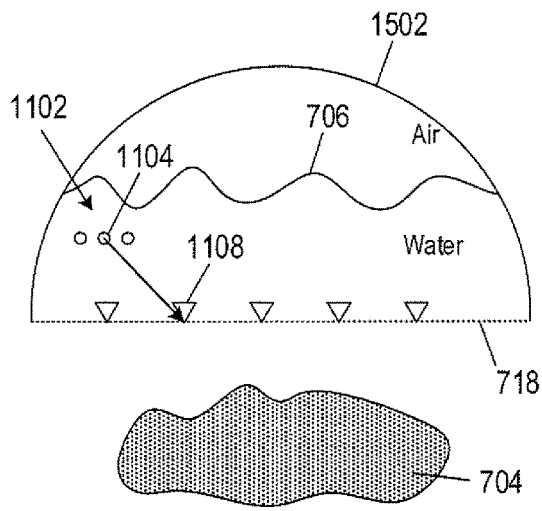
FIGS. 15A-15F show coupling of a normal derivative of an incident wavefield with subsurface reflectivity to determine a synthetic up-going pressure wavefield at a receiver location.
Figure 15B:
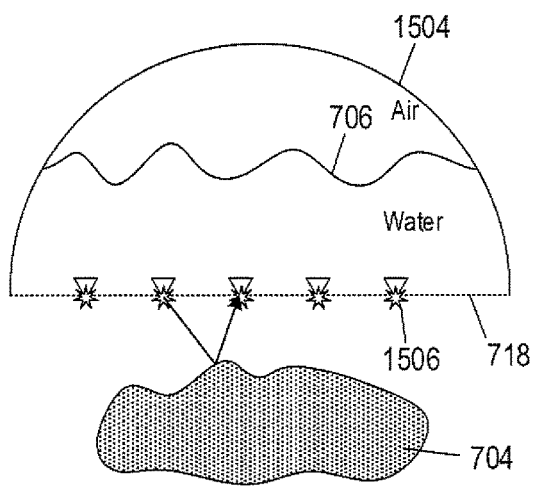

A synthetic up-going pressure wavefield at the coordinate location of the receiver may be computed by initially coupling the normal derivative of the incident wavefield, $\partial P_{inc}/\partial \vec{n}_{sep}$, with the subsurface reflectivity $P_{sub}$ in order to generate an up-going pressure wavefield at the separation level. FIG. 15A shows the acquisition geometry of the incident wavefield described above with reference to FIG. 11A. The source 1102 is enclosed within a volume defined by the separation level 718 and a hemispherical cup surface 1502. FIG. 15B shows the acquisition geometry of the subsurface reflectivity described above with reference to FIG. 8. A volume is also defined by the separation level 718 and a hemispherical cup surface 1504. The state shown in FIG. 15A contains the time-varying region of the model environment in which the incident wavefield and normal derivative of the incident wavefield are recorded. The state shown in FIG. 15B contains the stationary region of the model environment in which the subsurface reflectivity and normal derivative of the subsurface reflectivity are recorded. The virtual sources, such as virtual source 1506, are located along the separation level 718. The states represented in FIGS. 15A and 15B are coupled together to obtain a synthetic up-going pressure wavefield at the virtual receivers located at the separation level 718:

$$P_{UP}(\vec{x}_{sep}, t^{sep} | \vec{x}_s, 0) = -2 \int_{\tau_{min}^{tv}}^{\tau_{min}^{tv}} \int_{S_{sep}} P_{sub}\left(\vec{x}_{sep}, t^{sep} - t^{tv} | \vec{x}_{sep}, 0\right) \frac{\partial P_{inc}(\vec{x}_{sep}, t^{tv} | \vec{x}_s, 0)}{\partial \vec{n}_{sep}} dS_{sep} dt^{tv} \quad (24)$$

where $t^{tv} \in (\tau_{min}^{tv}, \tau_{max}^{tv})$; and $t^{sep}=t^{tv}+(t^{st}-\tau_s^{sepsub})$ is the local time axis for the combined state (i.e., time-varying and stationary states) with the recording at the separation level.

The up-going pressure wavefield of Equation (24) may be obtained by applying acoustic reciprocity and Sommerfeld radiation condition to the coupled states shown in FIGS. 15A-15B.

Figure 15C:
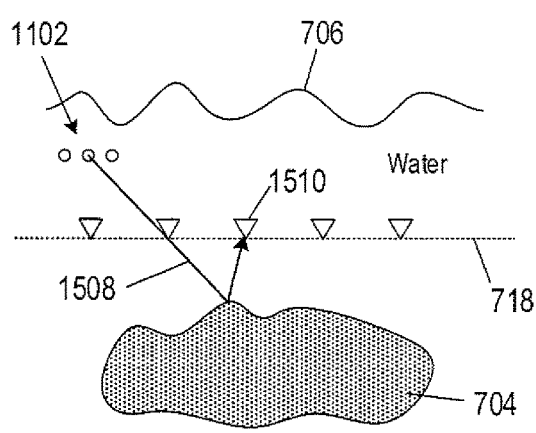

FIG. 15C shows the acquisition geometry of an up-going pressure wavefield measured at virtual receivers along the separation level 718. Directional arrow 1508 represents the path of an acoustic signal generated by the source 1102 that is reflected from the subsurface of the subterranean formation 704 to the virtual receiver 1510 located at the separation level 718. Equation (24) gives the up-going pressure wavefield measured by virtual receivers located at the separation level 718 shown in FIG. 15C.

Figure 15D:
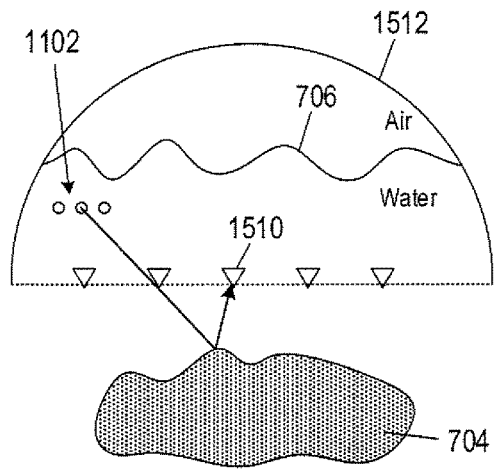
Figure 15E:
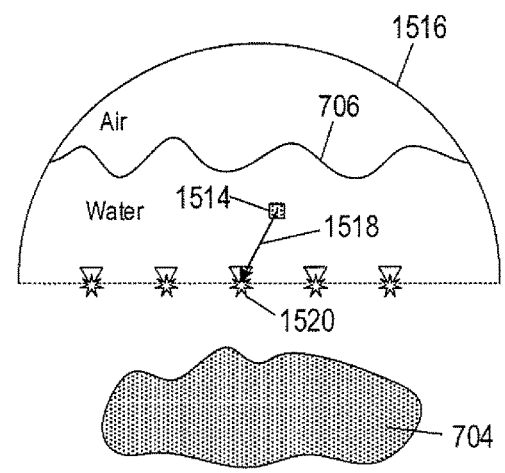

The normal derivative of the up-going pressure wavefield at the separation level given by Equation (24) is coupled with a Green's function of the time-varying region in order to compute the up-going wavefield at the coordinate location of the receiver, $\vec{x}_r$, where the receiver level and separation level are not the same. FIG. 15D shows the acquisition geometry of the up-going pressure wavefield at the separation level 718 described above with reference to FIG. 15C. The source 1102 is enclosed within a volume defined by the separation level 718 and a hemispherical cup surface 1512. FIG. 15E shows the acquisition geometry of a receiver 1514 at the coordinate location $\vec{x}_r$. The receiver 1514 is located within a volume defined by the separation level 718 and a hemispherical cup surface 1516. Directional arrow 1518 represents an acoustic signal that travels from the receiver 1514 to the virtual source 1520. Applying acoustic reciprocity relation in terms of separated wavefields with a Green's function of the time-varying medium that is down-going and replacing $t=t^{sep}+(t^{tv}-\tau_s^{r_{tv}})$ where $\tau_s^{r_{tv}}$ is the shooting time in the time-varying region, the synthetic up-going pressure wavefield at the coordinate of the receiver is given by:

$$P_{UP}(\vec{x}_r, t | \vec{x}_s, 0) = -2 \int_{\tau_{min}^{sep}}^{\tau_{max}^{sep}} \int_{S_{sep}} \left[ G^{tv}(\vec{x}_r, t - t^{sep} | \vec{x}_{sep}, 0) \right. \tag{25}$$

$$\left. \frac{\partial P_{UP}(\vec{x}_{sep}, t^{sep} | \vec{x}_s, 0)}{\partial \vec{n}_{sep}} \right] dS_{sep} dt^{sep}$$

where $t^{sep} \in (\tau_{min}^{sep}, \tau_{max}^{sep})$.

Figure 15F:
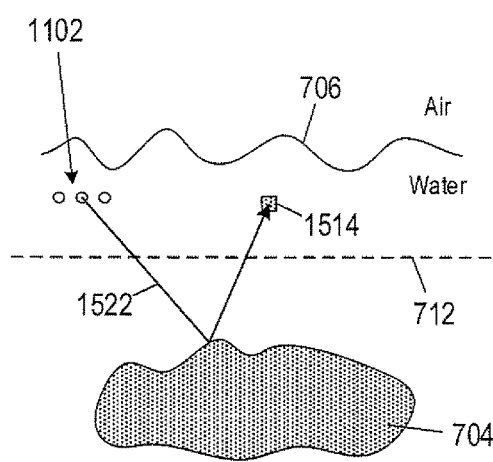

FIG. 15F shows the acquisition geometry of an up-going pressure wavefield measured at an actual receiver 1514 in the time-varying region. Directional arrow 1522 represents the path of an acoustic signal generated by the source 1102 that is reflected from the subsurface of the subterranean formation 704 to the receiver 1514 located at the coordinate location of the receiver $\vec{x}_r$. Equation (25) gives the synthetic up-going pressure wavefield measured at the coordinate location of the receiver 1514.

A synthetic up-going velocity vector wavefield at the coordinate location of the receiver may be computed from the synthetic up-going pressure wavefield of Equation (25) as follows:

$$\vec{V}_{UP}(\vec{x}_r, t | \vec{x}_s, 0) = -\frac{1}{\rho(\vec{x}_r)} \int_0^t \vec{\nabla} P_{UP}(\vec{x}_r, t' | \vec{x}_s, 0) dt' \tag{26}$$

The gradient of the synthetic up-going pressure wavefield at the receiver location, $\vec{\nabla} P_{UP}(\vec{x}_r, t | \vec{x}_s, 0)$, may be computed using the finite difference method. Alternatively, when the receiver level is flat, the gradient may be computed by transforming the synthetic up-going pressure wavefield $P_{UP}(\vec{x}_r, t | \vec{x}_s, 0)$ to the Fourier domain and multiplying by $-ik_z$.

Synthetic Source-Ghost Pressure and Velocity Vector Wavefields

Figure 16A:
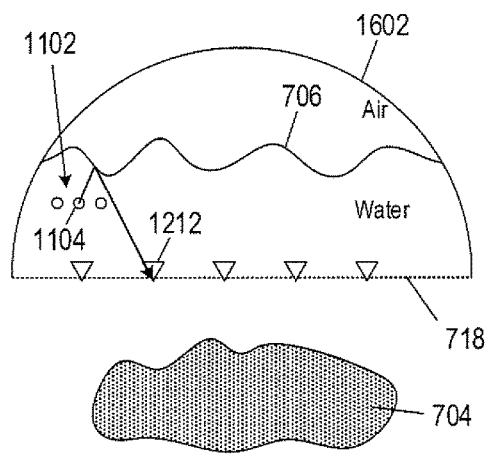
FIGS. 16A-16F show coupling of a normal derivative of a source-side scattered wavefield with subsurface reflectivity to determine a synthetic source-ghost pressure wavefield at a receiver location.
Figure 16B:
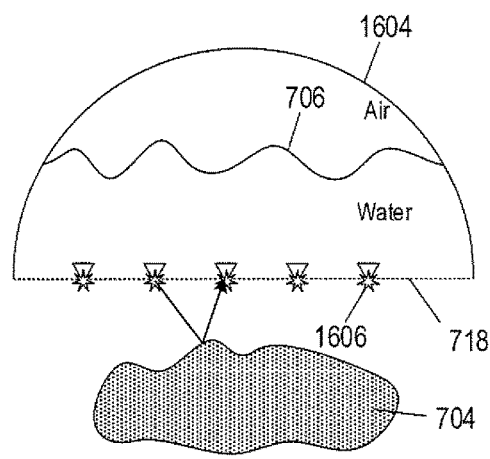

A synthetic source-ghost pressure wavefield may be computed by initially coupling the normal derivative of the source-side scattered wavefield at the separation level, $\partial P_{scat}/\partial \vec{n}_{sep}$, with the subsurface reflectivity $P_{sub}$ in order to generate the source-ghost pressure wavefield at the separation level. FIG. 16A shows the acquisition geometry of the source-side scattered wavefield described above with reference to FIG. 12. The source 1102 is enclosed within a volume defined by the separation level 718 and a hemispherical cup surface 1602. FIG. 16B shows the acquisition geometry of the subsurface reflectivity described above with reference to FIG. 8. A volume is defined by the separation level 718 and a hemispherical cup surface 1604. The state shown in FIG. 16A contains the time-varying region of the model environment in which the source-side scattered wavefield and normal derivative of the source-side scattered wavefield are recorded. The state shown in FIG. 16B contains the stationary region of the model environment in which the subsurface reflectivity and normal derivative of the subsurface reflectivity are recorded. The virtual sources, such as virtual source 1606, are located along the separation level 718. The states represented in FIGS. 16A and 16B are coupled together to obtain a synthetic source-ghost pressure wavefield measured at the virtual receivers located at the separation level 718:

$$P_{SG}(\vec{x}_{sep}, t^{sep} | \vec{x}_s, 0) = -2 \int_{\tau_{min}^{tv}}^{\tau_{min}^{tv}} \int_{S_{sep}} P_{sub}(\vec{x}_{sep}, t^{sep} - t^{tv} | \vec{x}_{sep}, 0) \tag{27}$$

$$\frac{\partial P_{scat}(\vec{x}_{sep}, t^{tv} | \vec{x}_s, 0)}{\partial \vec{n}_{sep}} dS_{sep} dt^{tv}$$

where
$t^{sep}=t^{tv}+t^{st}$ is the shooting time; and
$P_{sub}$ and $P_{scat}$ have been set to zero.

The synthetic source-ghost pressure wavefield of Equation (27) may be obtained by applying acoustic reciprocity and Sommerfeld radiation condition to the coupled states shown in FIGS. 16A-16B.

Figure 16C:
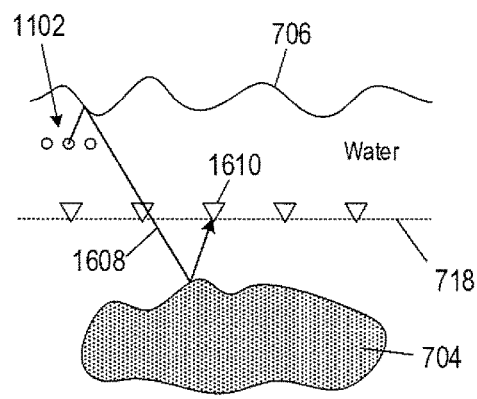

FIG. 16C shows the acquisition geometry of synthetic source-ghost pressure wavefield measured at a virtual receiver along the separation level 718. Directional arrow 1608 represents the path of an acoustic signal generated by the source 1102 that is reflected from the time-varying free surface 706 and the subsurface of the subterranean formation 704 to the virtual receiver 1610. Equation (27) gives the source-ghost pressure wavefield measured by virtual receivers located at the separation level 718.

Figure 16D:
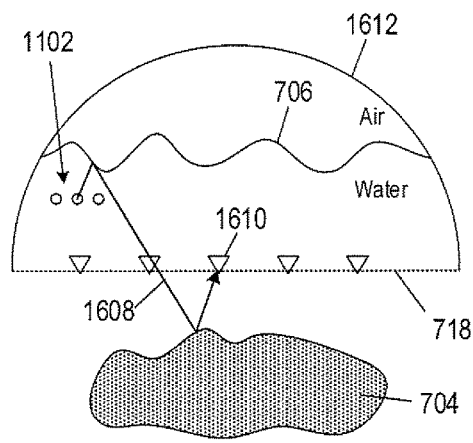
Figure 16E:
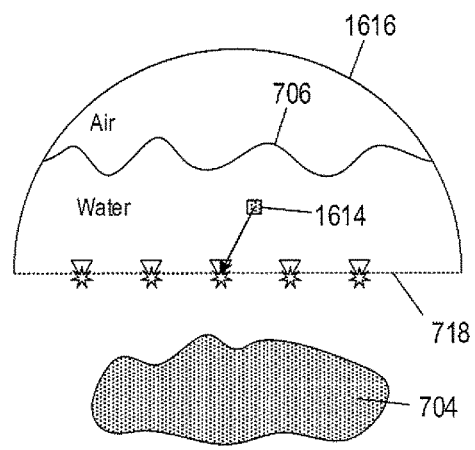

The normal derivative of the up-going pressure wavefield given by Equation (27) is coupled with a Green's function of the time-varying region in order to generate the synthetic source-ghost pressure wavefield at the coordinate location of the receiver $\vec{x}_r$. FIG. 16D shows the acquisition geometry of the source-ghost pressure wavefield at the separation level 718 described above with reference to FIG. 16C with the source 1102 enclosed within a volume defined by the separation level 718 and a hemispherical cup surface 1612. FIG. 16E shows the acquisition geometry of a receiver 1614 at the coordinate location of the receiver $\vec{x}_r$. The receiver 1614 is located within a volume defined by the separation level 718 and a hemispherical cup surface 1616. Applying acoustic reciprocity relation in terms of separated wavefields, taking into consideration that the Green's function is down-going, and replacing $t=t^{sep}+(t^{tv}-\tau_s^{r_{tv}})$, the synthetic source-ghost pressure wavefield at the coordinate location of the receiver may be given by:

$$P_{SG}(\vec{x}_r, t | \vec{x}_s, 0) = -2 \int_{\tau_{min}^{sep}}^{\tau_{max}^{sep}} \int_{S_{sep}} \left[ G^{tv}(\vec{x}_r, t - t^{sep} | \vec{x}_{sep}, 0) \right. \tag{28}$$

$$\left. \frac{\partial P_{SG}(\vec{x}_{sep}, t^{sep} | \vec{x}_s, 0)}{\partial \vec{n}_{sep}} \right] dS_{sep} dt^{sep}$$

where $t^{sep} \in (\tau_{min}^{sep}, \tau_{max}^{sep})$.

Figure 16F:
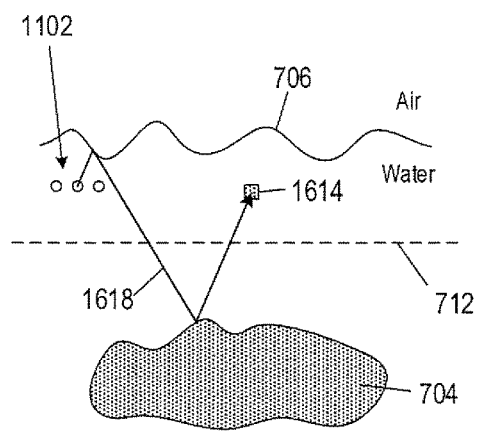

FIG. 16F shows the acquisition geometry of a synthetic source-ghost pressure wavefield measured at the coordinate location of the receiver 1614 in the time varying region. Directional arrow 1618 represents the path of an acoustic signal generated by the source 1102 that is reflected from the fee surface 706 and the subsurface of the subterranean formation 704 before reaching the receiver 1614 coordinate location $\vec{x}_r$. Equation (28) gives the synthetic source-ghost pressure wavefield measured at the coordinate location of the receiver 1614.

A synthetic source-ghost velocity vector wavefield at the coordinate location of the receiver may be computed from the synthetic source-ghost pressure wavefield obtain in Equation (28) as follows:

$$\vec{V}_{SG}(\vec{x}_r, t | \vec{x}_s, 0) = -\frac{1}{\rho(\vec{x}_r)} \int_0^t \vec{\nabla} P_{SG}(\vec{x}_r, t' | \vec{x}_s, 0) dt' \quad (29)$$

The gradient of the synthetic source-ghost pressure wavefield at the coordinated location of the receiver, $\vec{\nabla} P_{SG}(\vec{x}_r, t | \vec{x}_s, 0)$, may be computed using the finite difference method. Alternatively, when the receiver level is flat, the gradient may be computed by transforming the synthetic source-ghost pressure wavefield $P_{SG}(\vec{x}_r, t | \vec{x}_s, 0)$ to the Fourier domain and multiplying by $-ik_z$.

Synthetic Receiver-Ghost Pressure and Velocity Vector Wavefields

Figure 17A:
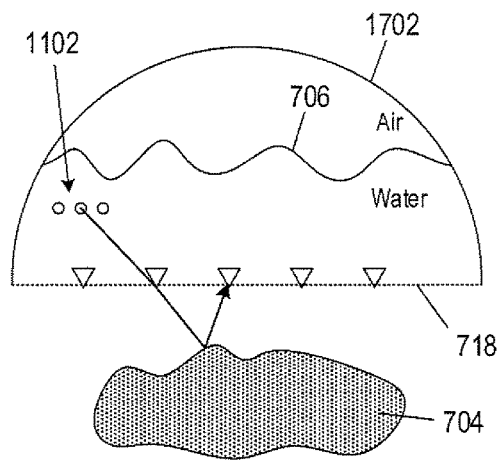
FIGS. 17A-17C show coupling of a normal derivative of an up-going pressure wavefield with a free-surface reflectivity to determine a synthetic receiver-ghost pressure wavefield at a separation level of a model environment.
Figure 17B:
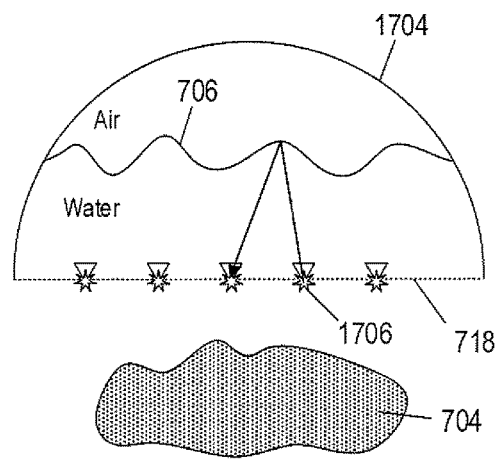

A synthetic receiver-ghost pressure wavefield may be computed by initially coupling the normal derivative of the up-going pressure wavefield, $\partial P_{UP}/\partial \vec{n}_{sep}$, with the free-surface reflectivity $P_{fs}$. FIG. 17A shows the acquisition geometry of an up-going wavefield measured by virtual receivers at the separation level 718 described above with reference to FIG. 15C. The source 1102 is enclosed within a volume defined by the separation level 718 and a hemispherical cup surface 1702. FIG. 17B shows the acquisition geometry of the free-surface reflectivity described above with reference to FIG. 9. Notice that time is backward time in FIG. 17B. A volume is also defined by the separation level 718 and a hemispherical cup surface 1704. The state shown in FIG. 17A contains the combined stationary and time-varying region of the model environment in which the up-going pressure wavefield and normal derivative of the up-going pressure wavefield are recorded. The state shown in FIG. 17B contains the time-varying region of the model environment in which the free-surface reflectivity and normal derivative of the free-surface reflectivity are recorded. The virtual sources, such as virtual source 1706, are located at the separation level 718. Using acoustic reciprocity and applying Sommerfeld radiation condition over the hemispherical cup surfaces, the states in FIGS. 17A and 17B are coupled to give the synthetic receiver-ghost pressure wavefield at the separation level:

$$P_{RG}(\vec{x}_{sep}, t^{sep'} | \vec{x}_s, 0) = -2 \int_{\tau_{min}^{sep}}^{\tau_{max}^{sep}} \int_{S_{sep}} \left[ P_{fs}(\vec{x}_{sep}, t^{sep'} - t^{sep} | \vec{x}_{sep}, 0) \frac{\partial P_{UP}(\vec{x}_{sep}, t^{sep} | \vec{x}_s, 0)}{\partial \vec{n}_{sep}} \right] dS_{sep} dt^{sep} \quad (30)$$

where $t^{sep'} = t^{sep} + t^{tv}$; and $t^{sep} \in (\tau_{min}^{sep}, \tau_{max}^{sep})$.

Figure 17C:
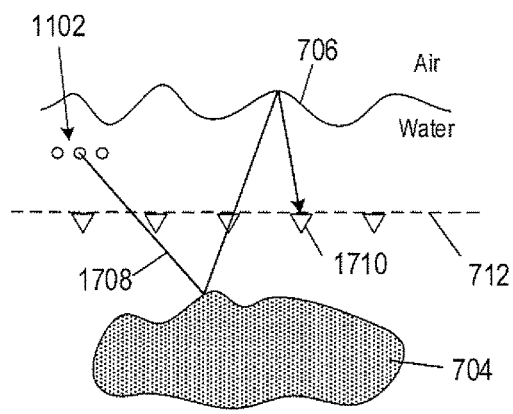

FIG. 17C shows the acquisition geometry of a synthetic receiver-ghost pressure wavefield at the separation level. A zigzag directional arrow 1708 represents the path of an acoustic signal generated by the source 1102 that is reflected from the subsurface of the subterranean formation 704 then from the time-varying free surface 706 before reaching the virtual receiver 1710.

The synthetic receiver-ghost pressure wavefield at a coordinate location of receiver is computed by extrapolating the synthetic receiver-ghost pressure wavefield obtained in Equation (30) to the coordinate location of the receiver using Kirchhoff-Helmholtz integral in the space-frequency domain as follows:

$$\hat{P}_{RG}(\vec{x}_r, \omega | \vec{x}_s) = \int_{S_{sep}} \{I_9\} dS_{sep} \quad (31)$$

where $$I_9 = -\hat{G}^{tv*}(\vec{x}_r, \omega | \vec{x}_{sep}) \frac{\partial \hat{P}_{RG}(\vec{x}_{sep}, \omega | \vec{x}_s)}{\partial \vec{n}_{sep}} -$$

$$\hat{P}_{RG}(\vec{x}_{sep}, \omega | \vec{x}_s) \frac{\partial \hat{G}^{tv*}(\vec{x}_r, \omega | \vec{x}_{sep})}{\partial \vec{n}_{sep}}$$

The synthetic receiver-ghost pressure wavefield of Equation (31) is transformed to the space-time domain and a synthetic receiver-ghost velocity vector wavefield at the coordinate location of the receiver may be computed as follows:

$$\vec{V}_{RG}(\vec{x}_r, t | \vec{x}_s, 0) = -\frac{1}{\rho(\vec{x}_r)} \int_0^t \vec{\nabla} P_{RG}(\vec{x}_r, t' | \vec{x}_s, 0) dt' \quad (32)$$

The gradient of the synthetic receiver-ghost pressure wavefield at the receiver, $\vec{\nabla} P_{RG}(\vec{x}_r, t | \vec{x}_s, 0)$, may be computed using the finite difference method. Alternatively, when the receiver level is flat, the gradient may be computed by transforming the synthetic receiver-ghost pressure wavefield $P_{RG}(\vec{x}_r, t | \vec{x}_s, 0)$ to the Fourier domain and multiplying by $-ik_z$.

Synthetic Source-Receiver Ghost Pressure and Velocity Vector Wavefields

Figure 18A:
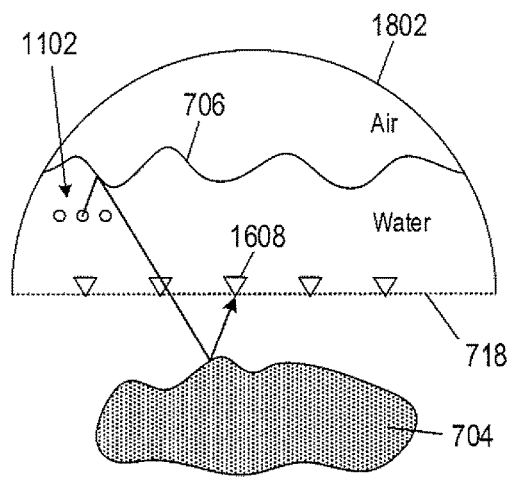
FIGS. 18A-18C show coupling of a normal derivative of a source-ghost pressure wavefield with a sea surface reflectivity to determine a synthetic source-receiver pressure wavefield at a separation level of a model environment.
Figure 18B:
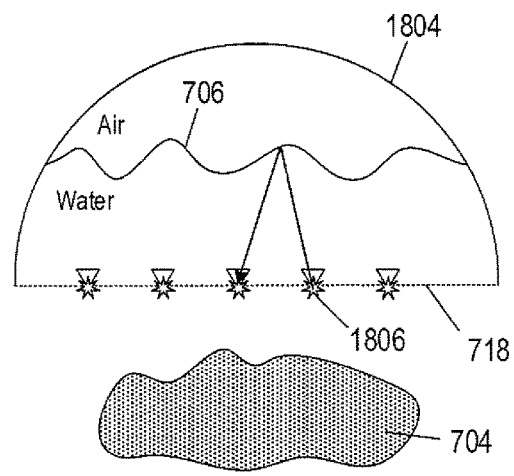

A synthetic source-receiver ghost pressure wavefield may be computed by initially coupling the normal derivative of the source-ghost pressure wavefield at the separation level, $\partial P_{SG}/\partial \vec{n}_{sep}$, with the free-surface reflectivity $P_{fs}$. FIG. 18A shows the acquisition geometry of a source-ghost pressure wavefield measured by virtual receivers at the separation level 718 shown in FIG. 16C. The source 1102 is enclosed within a volume defined by the separation level 718 and a hemispherical cup surface 1802. FIG. 18B shows the acquisition geometry of the free-surface reflectivity described above with reference to FIG. 9. Note that time is backward time in FIG. 18B. A volume is also defined by the separation level 718 and a hemispherical cup surface 1804. The state shown in FIG. 18A contains the combined stationary and time-varying region of the model environment in which the source-ghost pressure wavefield and normal derivative of the source-ghost pressure wavefield are recorded. The state shown in FIG. 18B contains the time-varying region of the model environment in which the free-surface reflectivity and normal derivative of the free-surface reflectivity are recorded. The virtual sources, such as virtual source 1806, are located along the separation level 718. Using acoustic reciprocity and applying Sommerfeld radiation condition over the hemispherical cup surfaces the states in FIGS. 18A and 18B are coupled to give the synthetic receiver-ghost pressure wavefield at the separation level:

$$P_{SRG}(\vec{x}_{sep}, t^{sep'} | \vec{x}_s, 0) = -2 \int_{\tau_{min}^{sep}}^{\tau_{max}^{sep}} \int_{S_{sep}} \{I_{10}\} dS_{sep} dt^{sep} \quad (33)$$

where $$t^{sep} \in (\tau_{min}^{sep}, \tau_{max}^{sep}); \text{ and}$$

$$I_{10} = P_{fs}(\vec{x}_{sep}, t^{sep'} - t^{sep} | \vec{x}_{sep}, 0) \frac{\partial P_{SG}(\vec{x}_{sep}, t^{sep} | \vec{x}_s, 0)}{\partial \vec{n}_{sep}}$$

Figure 18C:
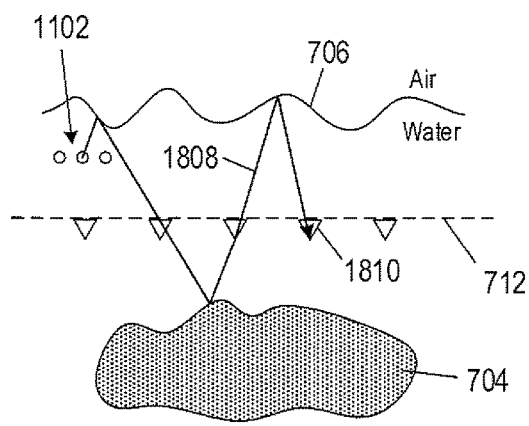

FIG. 18C shows the acquisition geometry of a synthetic source-receiver ghost pressure wavefield at the separation level 718. A zigzag directional arrow 1808 represents the path of an acoustic signal generated by the source 1102 that is reflected from the time-varying free surface 706, then the subsurface of the subterranean formation 704, and again from the time-varying free surface 706 before reaching the virtual receiver 1810.

The synthetic source-receiver ghost pressure wavefield at the coordinate location of the receiver is computed by extrapolating the synthetic source-receiver ghost pressure wavefield obtained in Equation (33) to the coordinate location of the receiver using Kirchhoff-Helmholtz integral in the space-frequency domain as follows:

$$\hat{P}_{SRG}(\vec{x}_r, \omega | \vec{x}_s) = \int_{S_{sep}} \{I_{11}\} dS_{sep} \quad (34)$$

where $$I_{11} = -\hat{G}^{fv*}(\vec{x}_r, \omega | \vec{x}_{sep}) \frac{\partial P_{SRG}(\vec{x}_{sep}, \omega | \vec{x}_s)}{\partial \vec{n}_{sep}} - \hat{P}_{SRG}(\vec{x}_{sep}, \omega | \vec{x}_s) \frac{\partial \hat{G}^{fv*}(\vec{x}_r, \omega | \vec{x}_{sep})}{\partial \vec{n}_{sep}}$$

The synthetic source-receiver ghost pressure wavefield of Equation (34) is transformed to space-time domain and a synthetic source-receiver ghost velocity vector wavefield at the coordinate location of the receiver may be computed as follows:

$$\vec{V}_{SRG}(\vec{x}_r, t | \vec{x}_s, 0) = -\frac{1}{\rho(\vec{x}_r)} \int_0^t \vec{\nabla} P_{SRG}(\vec{x}_r, t' | \vec{x}_s, 0) dt' \quad (35)$$

The gradient of the synthetic source-receiver ghost pressure wavefield at the receiver, $\vec{\nabla} P_{SRG}(\vec{x}_r, t | \vec{x}_s, 0)$, may be computed using the finite difference method. Alternatively, when the receiver level is flat, the gradient may be computed by transforming the synthetic source-receiver ghost pressure wavefield $P_{SRG}(\vec{x}_r, t | \vec{x}_s, 0)$ to the Fourier domain and multiplying by $-ik_z$.

Figure 19A:
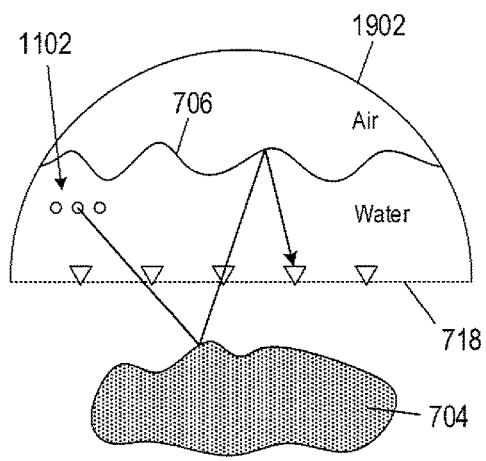
FIGS. 19A-19C show coupling of a normal derivative of a receiver-ghost pressure wavefield with a free-surface reflectivity to determine a synthetic first-order surface-related multiple pressure wavefield at a separation level of a model environment.
Figure 19B:
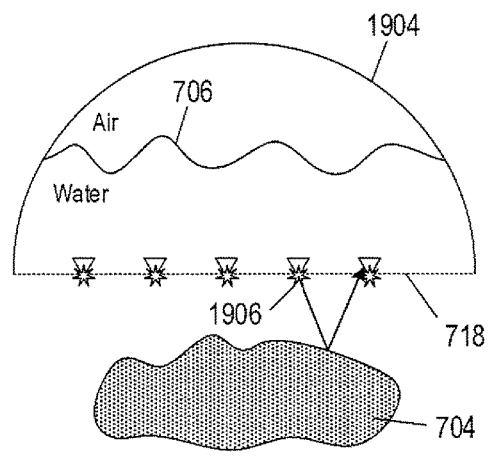

Synthetic First-Order Surface-Related Multiple Pressure and Velocity Vector Wave Fields A synthetic first-order surface-related multiple pressure wavefield may be computed by initially coupling the normal derivative of the receiver-ghost pressure at the separation level wavefield, $\partial P_{RG}/\partial \vec{n}_{sep}$, with the subsurface reflectivity $P_{sub}$. FIG. 19A shows the acquisition geometry of the receiver-ghost wavefield measured at virtual receivers along the separation level 718 shown in FIG. 17C. The source 1102 is enclosed within a volume defined by the separation level 718 and a hemispherical cup surface 1902. FIG. 19B shows the acquisition geometry of the subsurface reflectivity described above with reference to FIG. 8. A volume is also defined by the separation level 718 and a hemispherical cup surface 1904. The state shown in FIG. 19A contains the combined stationary and time-varying region of the model environment in which the receiver-ghost pressure wavefield and normal derivative of the receiver-ghost pressure wavefield are recorded. The state shown in FIG. 19B contains the time-varying region of the model environment in which the subsurface reflectivity and normal derivative of the subsurface reflectivity are recorded. The virtual sources, such as virtual source 1906, are located along the separation level 718. Using acoustic reciprocity and applying Sommerfeld radiation condition over the hemispherical cup surfaces the states in FIGS. 19A and 19B are coupled to give the synthetic first-order surface-related multiple pressure wavefield at the separation level:

$$P_{SM_1}(\vec{x}_{sep}, t^{sep''} | \vec{x}_s, 0) = -2 \int_{\tau_{min}^{sep'}}^{\tau_{min}^{sep'}} \int_{S_{sep}} \{I_{12}\} dS_{sep} dt^{sep'} \quad (36)$$

where $$t^{sep''} = t^{sep'} + t^{st}$$

$$t^{sep'} \in (\tau_{min}^{sep'}, \tau_{max}^{sep'}); \text{ and}$$

$$I_{12} = P_{sub}(\vec{x}_{sep}, t^{sep''} - t^{sep'} | \vec{x}_{sep}, 0) \frac{\partial P_{RG}(\vec{x}_{sep}, t^{sep'} | \vec{x}_s, 0)}{\partial \vec{n}_{sep}}$$

Figure 19C:
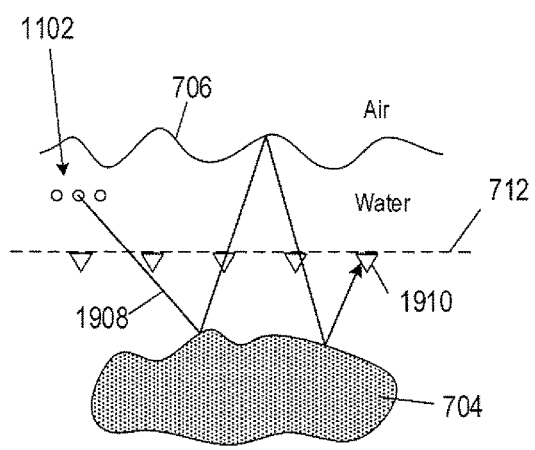

FIG. 19C shows the acquisition geometry of a synthetic source-receiver ghost pressure wavefield at the separation level. A zigzag directional arrow 1908 represents the path of an acoustic signal generated by the source 1102 that is twice reflected from the subsurface of the subterranean formation 704 and once from the time-varying free surface 706 before reaching the virtual receiver 1910.

The synthetic first-order surface-related multiple pressure wavefield at the coordinate location of the receiver is computed by extrapolating the synthetic first-order surface-related multiple wavefield obtained in Equation (36) to the coordinate location of the receiver as follows:

$$P_{SM_1}(\vec{x}_r, t | \vec{x}_s, 0) = -2 \int_{\tau_{min}^{sep''}}^{\tau_{max}^{sep''}} \int_{S_{sep}} \{I_{13}\} dS_{sep} dt^{sep''} \quad (37)$$

where $$t = t^{sep''} + (t^{tv} - \tau_s^{rfs})$$

$$t^{sep''} \in (\tau_{min}^{sep''}, \tau_{max}^{sep''}); \text{ and}$$

$$I_{13} = G^{tv}(\vec{x}_r, t - t^{sep''} | \vec{x}_{sep}, 0) \frac{\partial P_{SM_1}(\vec{x}_{sep}, t^{sep''} | \vec{x}_s, 0)}{\partial \vec{n}_{sep}}$$

A synthetic first-order surface-related multiple velocity vector wavefield at the coordinate location of the receiver may be computed from the synthetic first-order surface-related multiple pressure wavefield obtained in Equation (37) as follows:

$$\vec{V}_{SM_1}(\vec{x}_r, t | \vec{x}_s, 0) = -\frac{1}{\rho(\vec{x}_r)} \int_0^t \vec{\nabla} P_{SM_1}(\vec{x}_r, t' | \vec{x}_s, 0) dt' \qquad (38)$$

The gradient of the synthetic first-order surface-related multiple pressure wavefield at the receiver, $\vec{\nabla} P_{SM_1}(\vec{x}_r, t | \vec{x}_s, 0)$, may be computed using the finite difference method. Alternatively, when the receiver level is flat, the gradient may be computed by transforming the synthetic first-order surface-related multiple pressure wavefield $P_{SM_1}(\vec{x}_r, t | \vec{x}_s, 0)$ to the Fourier domain and multiplying by $-ik_z$.

Figure 20A:
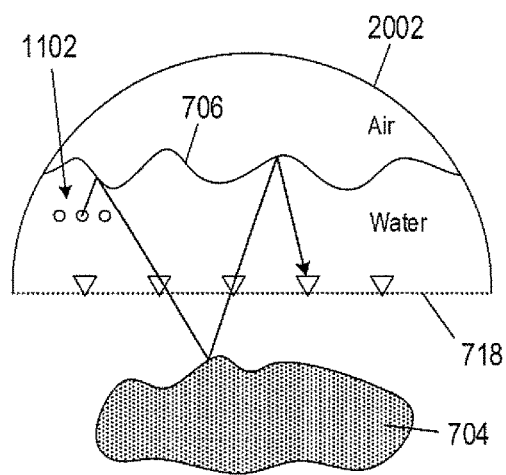
FIGS. 20A-20C show coupling of a normal derivative of a source-receiver ghost pressure wavefield with a subsurface reflectivity to determine a synthetic first-order surface-related multiple of source-receiver pressure wavefield at a separation level of a model environment.
Figure 20B:
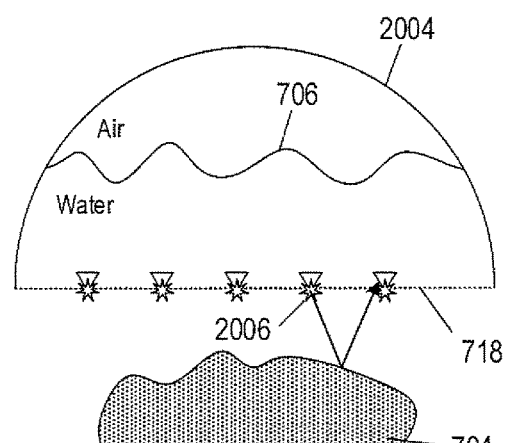

Synthetic First-Order Surface-Related Multiple of Source-Ghost Pressure and Velocity Vector Wavefields A synthetic first-order surface-related multiple of source-receiver ghost pressure wavefield may be computed by coupling the normal derivative of the source-receiver ghost pressure wavefield at the separation level, $\partial P_{SRG}/\partial \vec{n}_{sep}$, with the free-surface reflectivity $P_{fs}$. FIG. 20A shows the acquisition geometry of the source-receiver ghost pressure wavefield measured by virtual receivers at the separation level 718 shown in FIG. 18C. The source 1102 is enclosed within a volume defined by the separation level 718 and a hemispherical cup surface 2002. FIG. 20B shows the acquisition geometry of the subsurface reflectivity described above with reference to FIG. 8. A volume is also defined by the separation level 718 and a hemispherical cup surface 2004. The state shown in FIG. 20A contains the combined stationary and time-varying region of the model environment in which the source-receiver ghost pressure wavefield and normal derivative of the source-receiver ghost pressure wavefield are recorded. The state shown in FIG. 20B contains the stationary region of the model environment in which the subsurface reflectivity and normal derivative of the subsurface reflectivity are recorded. The virtual sources, such as virtual source 2006, are located at the separation level 718. Using acoustic reciprocity and applying Sommerfeld radiation condition over the hemispherical cup surfaces the states in FIGS. 20A and 20B are coupled to give the synthetic first-order surface-related multiple of source-ghost pressure wavefield at the separation level:

$$P_{SM_1-SG}(\vec{x}_{sep}, t^{sep''} | \vec{x}_s, 0) = -2 \int_{\tau_{min}^{sep'}}^{\tau_{max}^{sep'}} \int_{S_{sep}} \{I_{14}\} dS_{sep} dt^{sep'} \qquad (39)$$

where $t^{sep'} \in (\tau_{min}^{sep'}, \tau_{max}^{sep'})$; and $$I_{14} = P_{sub}(\vec{x}_{sep}, t^{sep''} - t^{sep'} | \vec{x}_{sep}, 0) \frac{\partial P_{SRG}(\vec{x}_{sep}, t^{sep'} | \vec{x}_s, 0)}{\partial \vec{n}_{sep}}$$

Figure 20C:
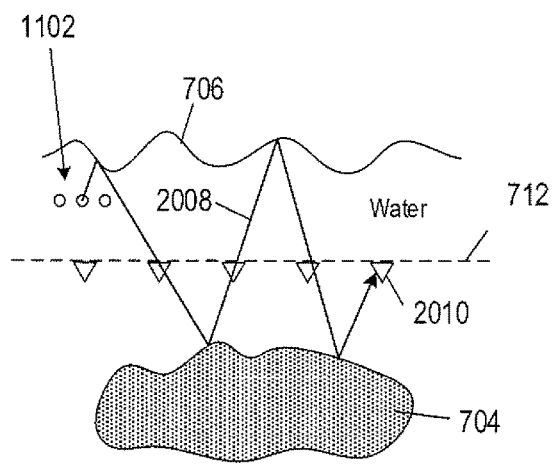

FIG. 20C shows the acquisition geometry of a synthetic first-order surface-related multiple of source-ghost pressure wavefield at the separation level. A zigzag directional arrow 2008 represents the path of an acoustic signal generated by the source 1102 that is twice reflected from the subsurface of the subterranean formation 704 and twice reflected from the time-varying free surface 706 before reaching the virtual receiver 2010.

The synthetic first-order surface-related multiple of source-ghost pressure wavefield at the coordinate location of the receiver is computed by extrapolating the synthetic first-order surface-related multiple of source-ghost wavefield obtained in Equation (39) to the coordinate location of the receiver as follows:

$$P_{SM_1-SG}(\vec{x}_r, t | \vec{x}_s, 0) = -2 \int_{\tau_{min}^{sep''}}^{\tau_{max}^{sep''}} \int_{S_{sep}} \{I_{15}\} dS_{sep} dt^{sep''} \qquad (40)$$

where $t^{sep''} \in (\tau_{min}^{sep''}, \tau_{max}^{sep''})$; and $$I_{15} = G^{fv}(\vec{x}_r, t - t^{sep''} | \vec{x}_{sep}, 0) \frac{\partial P_{SM_1-SG}(\vec{x}_{sep}, t^{sep''} | \vec{x}_s, 0)}{\partial \vec{n}_{sep}}$$

A synthetic first-order surface-related multiple of source-ghost velocity vector wavefield at the coordinate location of the receiver may be computed from the synthetic first-order synthetic first-order surface-related multiple of source-ghost pressure wavefield obtained in Equation (40) as follows:

$$\vec{V}_{SM_1-SG}(\vec{x}_r, t | \vec{x}_s, 0) = -\frac{1}{\rho(\vec{x}_r)} \int_0^t \vec{\nabla} P_{SM_1-SG}(\vec{x}_r, t' | \vec{x}_s, 0) dt' \qquad (41)$$

The gradient of the synthetic first-order surface-related multiple of source-ghost pressure wavefield at the receiver, $\vec{\nabla} P_{SM_1-SG}(\vec{x}_r, t | \vec{x}_s, 0)$, may be computed using the finite difference method. Alternatively, when the receiver level is planar, the gradient may be computed by transforming the synthetic first-order surface-related multiple of source-ghost pressure wavefield $P_{SM_1-SG}(\vec{x}_r, t | \vec{x}_s, 0)$ to the Fourier domain and multiplying by $-ik_z$.

A model environment may be updated to approximate an actual subterranean formation by minimizing a difference between actual pressure data and/or velocity data obtained in an actual marine seismic survey of the subterranean formation and the synthetic pressure wavefield and/or synthetic velocity vector wavefield calculated as described above for the model environment. For example, full waveform inversion ("FWI") is a non-linear, iterative, data-fitting procedure used to determine estimates of subterranean surface properties from actual pressure and velocity wavefield data obtained in a marine seismic survey. FWI begins with an initial model environment that is used to generate synthetic pressure wavefield and/or synthetic velocity vector wavefield as described above. For each iteration, the model environment is iteratively updated, or adjusted, until an acceptable minimum difference between the actual pressure and velocity wavefield data and the synthetic pressure and/or velocity vector wavefield data computed for each adjustment of the model environment is obtained. The resulting model environment approximates the actual subterranean formation. Seismic imaging and other seismic data processing techniques may be applied to the model environment to determine subsurface rock properties of the subterranean formation, identify a potential hydrocarbon reservoir, or monitor a hydrocarbon reservoir under production.

Synthetic pressure and velocity vector wavefields computed for a given state of the time-varying free surface may be used to set a low frequency compensation ("LFC") limit in a marine seismic survey. Seismic waves that propagate in a subterranean formation are attenuated which is frequency dependent. Higher frequency seismic waves are absorbed more rapidly than lower frequency seismic waves resulting in a narrow frequency spectrum. Improved low-frequency content of actual pressure and velocity wavefield data enhances the quality and accuracy of seismic inversion and seismic images of the subterranean formation. The frequency spectrum of a synthetic pressure wavefield computed for a given state of the time-varying free surface as described above may be used to identify second receiver-side pressure ghost notch locations (i.e., place in the frequency spectrum where the frequencies dips are, or approach, zero). These notch locations are used to determine the LFC limit that may be used to record pressure and velocity wavefield data in an actual marine seismic survey.

A time-varying free surface used to compute synthetic pressure wavefield and synthetic velocity vector wavefield may be computed from separated wavefield imaging of the time-varying free surface. The synthetic pressure wavefield and the synthetic velocity vector wavefield may be used with reverse-time migration ("RTM") applied to actual pressure and velocity wavefields recorded in a marine seismic survey to generate an image of a subterranean formation. As a result, the image of the subterranean formation generated using RTM includes contributions from the actual time-varying free surface.

Note that not all of the synthetic pressure wavefield components $P_{DR}$, $P_{UP}$, $P_{SG}$, $P_{RG}$, $P_{SRG}$, $P_{SM_1}$, and $P_{SM_1-SG}$ have to be computed to obtain a synthetic pressure wavefield. In other embodiments, only certain synthetic pressure wavefield components may be computed and combined to obtain a synthetic pressure wavefield. For example, the synthetic pressure wavefields components $P_{DR}$, $P_{UP}$, $P_{SG}$, $P_{RG}$, and $P_{SRG}$ may be computed as described above and summed to obtain a synthetic pressure wavefield. In other embodiments, the model environment may be iteratively adjusted to approximate an actual subterranean formation as described above based on a synthetic pressure wavefield computed for each adjustment to the model environment and a measured pressure wavefield obtained in a marine seismic survey of the subterranean formation. Properties of the subterranean formation may be obtained from the resulting model environment.

Figure 21:
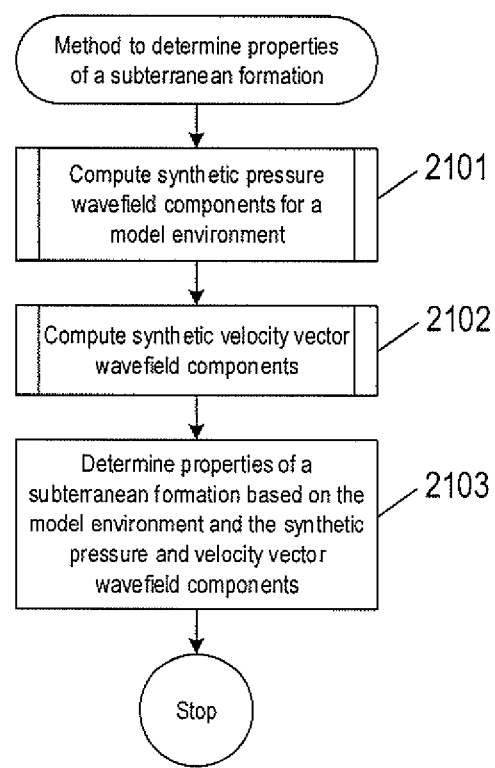
FIG. 21 shows a control-flow diagram of a method to determine properties of a subterranean formation.

FIG. 21 shows a control-flow diagram of a method to determine properties of a subterranean formation. In block 2101, a routine "compute synthetic pressure wavefield components for a model environment" is called. The synthetic pressure wavefield components are computed by modelling reflections and propagation of acoustic energy in a model environment that comprises a model subterranean formation located below of model body of water as described above. The model environment is separated into a time-varying region that includes a time-varying free surface of the body of water and a stationary region that includes a portion of the body of water and the model subterranean formation described above with reference to FIGS. 7 and 8. In block 2102, a routine "compute synthetic velocity vector wavefield components" is called to compute the synthetic velocity vector wavefield components from the pressure wavefield components. In block 2103, properties of the subterranean formation are determined based on the model environment, the synthetic pressure and velocity vector wavefield components and measured pressure and velocity wavefield data obtained from a marine seismic survey of the subterranean formation.

Figure 22:
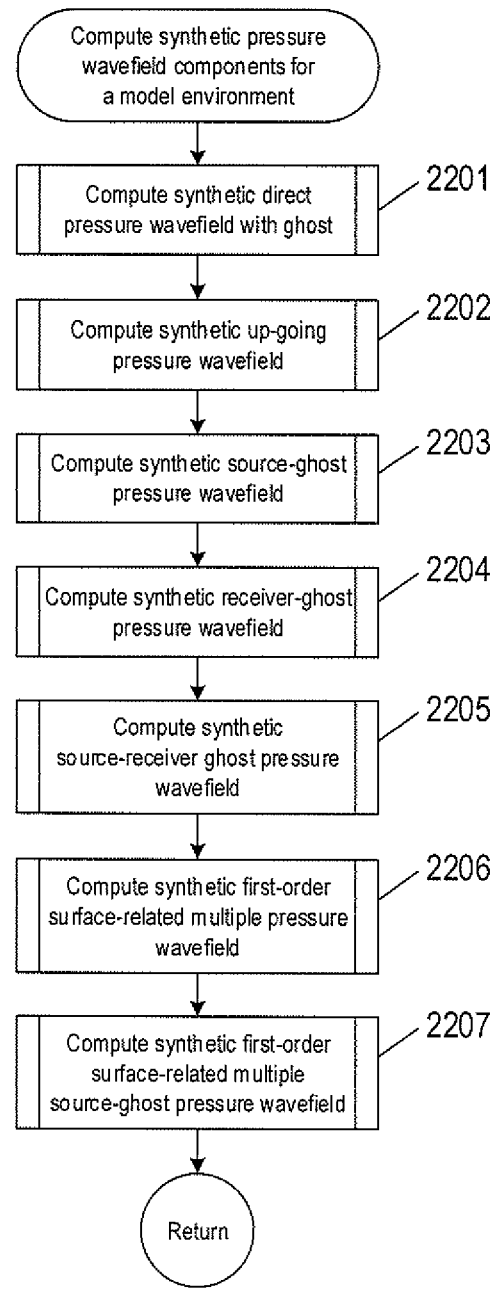
FIG. 22 shows a control-flow diagram of a routine "compute synthetic pressure wavefield components for a model environment" called in FIG. 21.

FIG. 22 shows a control-flow diagram of the routine "compute synthetic pressure wavefield components for a model environment" called in block 2101 of FIG. 21. In block 2201, a routine "compute synthetic direct pressure wavefield with ghost" is called. In block 2202, a routine "compute synthetic up-going pressure wavefield" is called. In block 2203, a routine "compute synthetic source-ghost pressure wavefields" is called. In block 2204, a routine "compute synthetic receiver-ghost pressure wavefield" is called. In block 2205, a routine "compute synthetic source-receiver ghost pressure wavefield" is called. In block 2206, a routine "compute synthetic first-order surface-related multiple pressure wavefield" is called. In block 2207, a routine "compute synthetic first-order surface-related multiple source-ghost pressure wavefield" is called.

Figure 23:
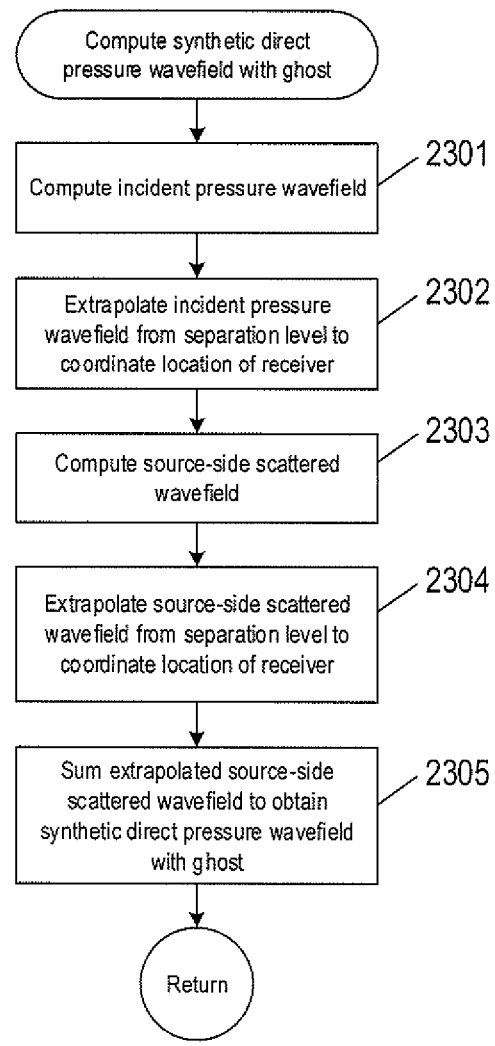
FIG. 23 shows a control-flow diagram of a routine "compute synthetic direct pressure wavefield with a source ghost" called in FIG. 22.

FIG. 23 shows a control-flow diagram of the routine "compute synthetic direct pressure wavefield with ghost" called in block 2201 of FIG. 22. In block 2301, an incident wavefield is computed at a separation level based on notional source signatures of source elements as described above with reference to FIGS. 11A-11B and Equation (16). In block 2302, the incident wavefield is extrapolated to a coordinate location of a receiver in accordance with Equation (20). In block 2303, a source-side scattered wavefield is computed at the separation level as described above with reference to Equation (17). In block 2304, the source-side scattered wavefield is extrapolated to the coordinate location of the receiver as described above with reference to Equation (21). In block 2305, the incident wavefield at the coordinate location of the receiver and the source-side scattered wavefield at the coordinate location of the receiver are summed to obtain a synthetic direct pressure wavefield with ghost at the coordinate location of the receiver as described above with reference to Equation (22).

Figure 24:
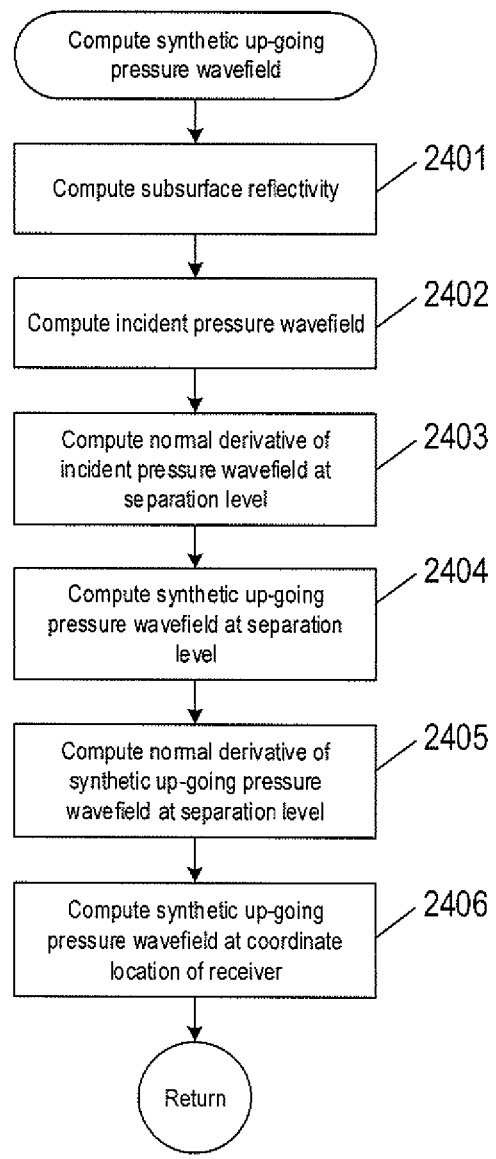
FIG. 24 shows a control-flow diagram of a routine "compute synthetic up-going pressure wavefield" called in FIG. 22.

FIG. 24 shows a control-flow diagram of the routine "compute synthetic up-going pressure wavefield" called in block 2202 of FIG. 22. In block 2401, a subsurface reflectivity is computed as described above with reference to Equation (11). In block 2402, an incident wavefield is computed at a separation level based on notional source signatures of source elements as described above with reference to FIGS. 11A-11B and Equation (16). In block 2403, a normal derivative of the incident wavefield is computed as described above with reference to Equation (19). In block 2404, a synthetic up-going pressure wavefield at a separation level is computed based on the subsurface reflectivity and the normal derivative of the incident wavefield as described above with reference to Equation (24). In block 2405, a normal derivative of the synthetic up-going pressure wavefield at the separation level is computed as described above with reference to Equation (22). In block 2406, a synthetic up-going pressure wavefield at the coordinate location of the receiver is computed based on the normal derivative of the up-going pressure wavefield as described above with reference to Equation (25).

Figure 25:
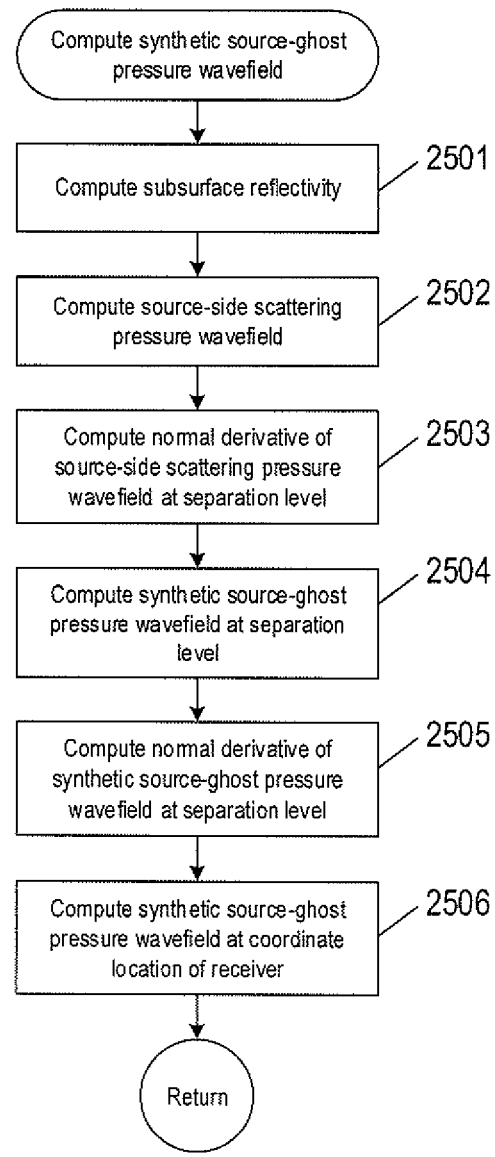
FIG. 25 shows a control-flow diagram of a routine "compute synthetic source-ghost pressure wavefield" called in FIG. 22.

FIG. 25 shows a control-flow diagram of the routine "compute synthetic source-ghost pressure wavefield" called in block 2203 of FIG. 22. In block 2501, a subsurface reflectivity is computed as described above with reference to Equation (6). In block 2502, a source-side scattered wavefield is computed at the separation level as described above with reference to Equation (17). In block 2503, a normal derivative of the source-side scattered wavefield at the separation level is computed as described above with reference to Equation (19). In block 2504, a synthetic source-ghost pressure wavefield at the separation level is computed based on the subsurface reflectivity and the normal derivative of the source-side scattered wavefield as described above with reference to Equation (27). In block 2505, a normal derivative of the synthetic source-ghost pressure wavefield at the separation level is computed as described above with reference to Equation (19). In block 2506, a synthetic source-ghost pressure wavefield at the coordinate location of the receiver is computed based on the normal derivative of the synthetic source-ghost pressure wavefield at the separation level as described above with reference to Equation (28).

Figure 26:
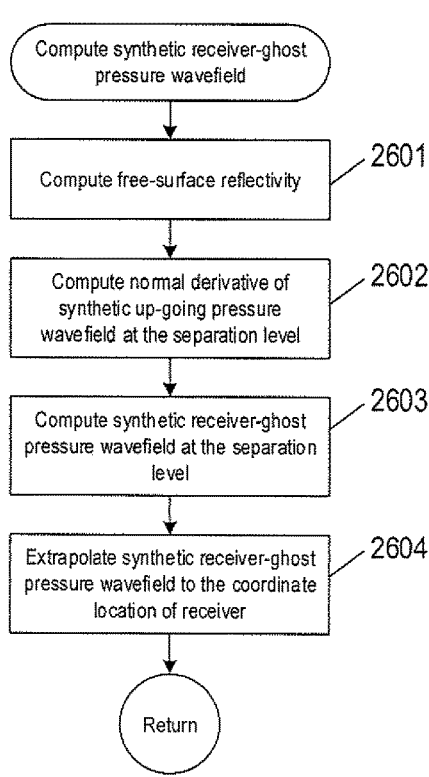
FIG. 26 shows a control-flow diagram of a routine "compute synthetic receiver-ghost pressure wavefield" called in FIG. 22.

FIG. 26 shows a control-flow diagram of the routine "compute synthetic receiver-ghost pressure wavefield" called in block 2204 of FIG. 22. In block 2601, a free-surface reflectivity is computed as described above with reference to Equation (12). In block 2602, a normal derivative of the synthetic up-going pressure wavefield at the separation level is computed as described above with reference to Equation (19). In block 2603, a synthetic receiver-ghost pressure wavefield at the separation level is computed based on the free-surface reflectivity and the normal derivative of the synthetic up-going pressure wavefield at the separation level as described above with reference to Equation (30). In block 2604, the synthetic receiver-ghost at the separation level is extrapolated to the coordinate location of the receiver as described above with reference to Equation (31).

Figure 27:
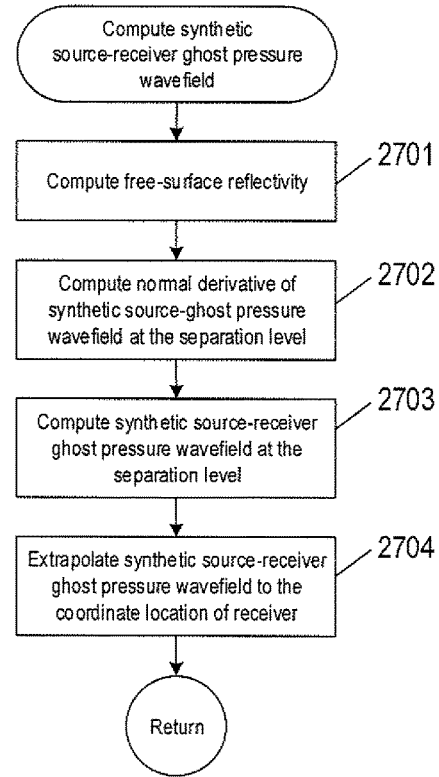
FIG. 27 shows a control-flow diagram of a routine "compute synthetic source-receiver ghost pressure wavefield" called in FIG. 22.

FIG. 27 shows a control-flow diagram of the routine "compute synthetic source-receiver ghost pressure wavefield" called in block 2205 of FIG. 22. In block 2701, the free-surface reflectivity is computed as described above with reference to Equation (12). In block 2702, a normal derivative of the synthetic source-ghost pressure wavefield at the separation level is computed as described above with reference to Equation (19). In block 2703, a synthetic source-receiver ghost pressure wavefield at the separation level is computed based on the free-surface reflectivity and the normal derivative of the synthetic source-ghost pressure wavefield at the separation level as described above with reference to Equation (33). In block 2704, the synthetic source-receiver ghost pressure wavefield at the separation level is extrapolated to the coordinate location of the receiver as described above with reference to Equation (34).

FIG. 28 shows a control-flow diagram of the routine "compute synthetic first-order surface-related multiple pressure wavefield" called in block 2206 of FIG. 22. In block 2801, the subsurface reflectivity is computed as described above with reference to Equation (11). In block 2802, a normal derivative of the synthetic receiver-ghost pressure wavefield at the separation level is computed as described above with reference to Equation (19). In block 2803, a synthetic first-order surface-related multiple pressure wavefield at the separation level is computed based on the subsurface reflectivity and the normal derivative of the synthetic receiver-ghost pressure wavefield at the separation level as described above with reference to Equation (36). In block 2804, the synthetic first-order surface-related multiple pressure wavefield at the separation level is extrapolated to the coordinate location of the receiver as described above with reference to Equation (37).

FIG. 29 shows a control-flow diagram of the routine "compute synthetic first-order surface-related multiple source-ghost pressure wavefield" called in block 2207 of FIG. 22. In block 2901, the subsurface reflectivity is computed as described above with reference to Equation (11). In block 2902, a normal derivative of the synthetic source-receiver ghost pressure wavefield at the separation level is computed as described above with reference to Equation (19). In block 2903, a synthetic first-order surface-related multiple of source-ghost pressure wavefield at the separation level is computed based on the subsurface reflectivity and the normal derivative of the synthetic source-receiver ghost pressure wavefield at the separation level as described above with reference to Equation (39). In block 2904, the synthetic first-order surface-related multiple of source-ghost pressure wavefield at the separation level is extrapolated to the coordinate location of the receiver as described above with reference to Equation (40).

Figure 30:
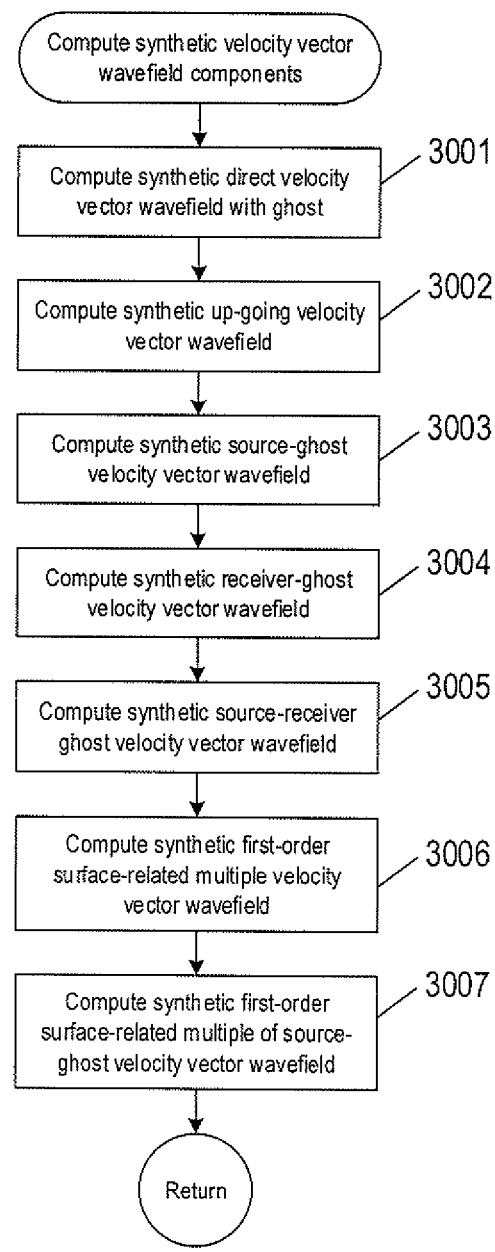
FIG. 30 shows a control-flow diagram of the routine "compute synthetic velocity vector wavefield components" called in FIG. 21.

FIG. 30 shows a control-flow diagram of the routine "compute synthetic velocity vector wavefield components" called in block 2102 of FIG. 21. In block 3001, a synthetic direct velocity vector wavefield with ghost is computed based on the synthetic direct pressure wavefield with ghost as described above with reference to Equation (23). In block 3002, a synthetic up-going velocity vector wavefield at the coordinate location of the receiver is computed based on the synthetic up-going pressure wavefield as described above with reference to Equation (26). In block 3003, a synthetic source-ghost velocity vector wavefield at the coordinate location of the receiver is computed based on the synthetic source-ghost pressure wavefield at the coordinate location of the receiver as described above with reference to Equation (29). In block 3004, a synthetic receiver-ghost velocity vector wavefield at the coordinate location of the receiver is computed based on the synthetic receiver-ghost pressure wavefield at the coordinate location of the receiver as described above with reference to Equation (32). In block 3005, a synthetic source-receiver ghost velocity vector wavefield at the coordinate location of the receiver is computed based on the synthetic receiver-ghost pressure wavefield at the coordinate location of the receiver as described above with reference to Equation (35). In block 3006, a synthetic first-order surface-related multiple velocity vector wavefield at the coordinate location of the receiver is computed based on the synthetic first-order surface-related multiple pressure wavefield at the coordinate location of the receiver as described above with reference to Equation (38). In block 3007, a synthetic first-order surface-related multiple of source-ghost velocity vector wavefield at the coordinate location of the receiver is computed based on the synthetic first-order surface-related multiple of source-ghost pressure wavefield at the coordinate location of the receiver as described above with reference to Equation (41).

Figure 31:
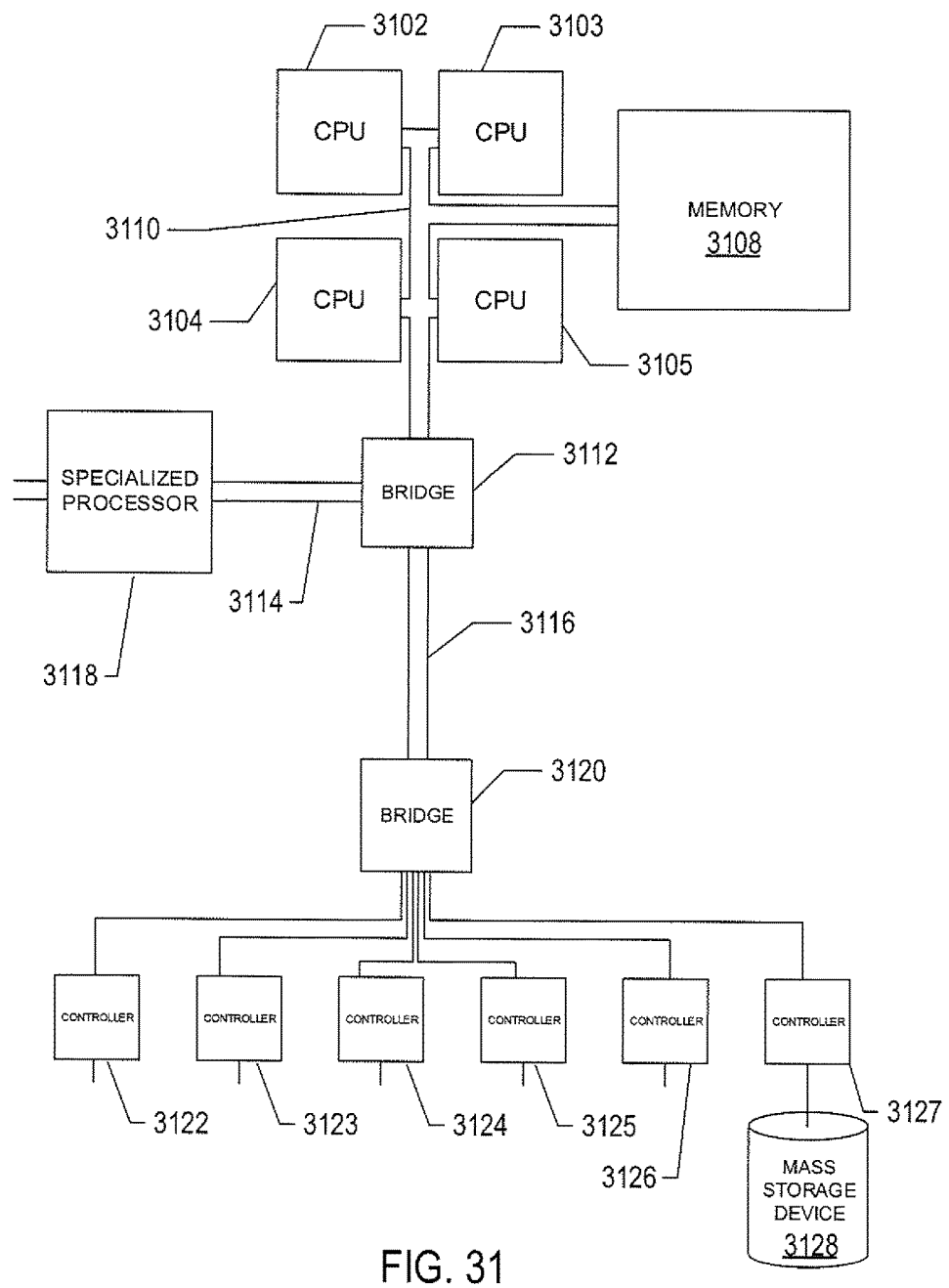
FIG. 31 shows a generalized computer system that executes methods to determine properties of a subterranean formation.

FIG. 31 shows an example of a generalized computer system that executes efficient methods to determine properties of a subterranean formation and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 3102-3105, one or more electronic memories 3108 interconnected with the CPUs by a CPU/memory-subsystem bus 3110 or multiple busses, a first bridge 3112 that interconnects the CPU/memory-subsystem bus 3110 with additional busses 3114 and 3116, or other types of high-speed interconnection media, including multiple, high-speed serial interconnects. The busses or serial interconnections, in turn, connect the CPUs and memory with specialized processors, such as a graphics processor 3118, and with one or more additional bridges 3120, which are interconnected with high-speed serial links or with multiple controllers 3122-3127, such as controller 3127, that provide access to various different types of computer-readable media, such as computer-readable medium 3128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 3128 is a data-storage device, including electronic memory, optical or magnetic disk drive, USB drive, flash memory and other such data-storage device. The computer-readable medium 3128 can be used to store machine-readable instructions that encode the computational methods described above and can be used to store encoded data, during store operations, and from which encoded data can be retrieved, during read operations, by computer systems, data-storage systems, and peripheral devices.

The methods and systems disclosed herein may be use to create or process a geophysical data product indicative of certain properties of a subterranean formation. The geophysical data product may include geophysical data such as pressure data, particle motion data, particle velocity data, particle acceleration data, and any seismic image that results from using the methods and systems described above. The geophysical data product may include also synthetic seismic data such as synthetic pressure data, synthetic particle motion data, synthetic particle velocity data, synthetic particle acceleration data, and any seismic image and any properties of a subterranean formation computed from synthetic and actual pressure and/or velocity data that results from using the methods and systems described above. A representation of the geophysical data product may be recorded on a non-transitory computer-readable medium as described above. The geophysical data product may be produced offshore (i.e., by equipment on the survey vessel 102) or onshore (i.e., at a computing facility on land).

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation using marine seismic techniques in which a source is activated in a body of water above the subterranean formation and a pressure wavefield reflected from the subterranean formation is measured by receivers located in the body of water, the specific improvement comprising:
   computing synthetic pressure wavefield components based on a model environment separated into a stationary region and a time-varying region that includes a time-varying free surface, each synthetic pressure wavefield component representing a portion of acoustic energy generated by the source in the time-varying region that travels between the time-varying free surface and a subsurface in the stationary region to a receiver; and
   generating an image of the subterranean formation based on the model environment, the synthetic pressure wavefield components, and the measured pressure wavefield, thereby the image revealing properties of the subterranean formation.

2. The method of claim 1, wherein computing the synthetic pressure wavefield components comprises:
   computing an incident wavefield at a separation level of the model environment based on notional source signatures of source elements of the source;
   extrapolating the incident wavefield to a coordinate location of a receiver;
   computing a source-side scattered wavefield at the separation level based on the incident wavefield;
   extrapolating the source-side scattered wavefield to the coordinate location of the receiver; and
   combining the incident wavefield at the coordinate location of the receiver and the source-side scattered wavefield at the coordinate location of the receiver to obtain a synthetic direct pressure wavefield with ghost at the coordinate location of the receiver.

3. The method of claim 1, wherein computing the synthetic pressure wavefield components comprises:
   computing a subsurface reflectivity of the subterranean formation at a separation level of the model environment;
   computing an incident wavefield at the separation level based on notional source signatures of source elements of the source;
   computing a normal derivative of the incident wavefield at the separation level;
   computing a synthetic up-going pressure wavefield at the separation level based on the subsurface reflectivity and the normal derivative of the incident wavefield at the separation level;
   computing a normal derivative of the synthetic up-going pressure wavefield at the separation level; and
   computing a synthetic up-going pressure wavefield at the coordinate location of the receiver based on the normal derivative of the up-going pressure wavefield at the separation level.

4. The method of claim 3, further comprises:
   computing a free-surface reflectivity of the time-varying free surface;
   computing a normal derivative of the synthetic up-going pressure wavefield at the separation level;
   computing a synthetic receiver-ghost pressure wavefield at the separation level based on the free-surface reflectivity and the normal derivative of the synthetic up-going pressure wavefield at the separation level; and
   extrapolating the synthetic receiver-ghost pressure wavefield from the separation level to the coordinate location of the receiver to obtain a synthetic receiver-ghost pressure wavefield at the coordinate location of the receiver.

5. The method of claim 4, further comprises:
   computing a normal derivative of the synthetic receiver-ghost pressure wavefield at the separation level;
   computing a synthetic first-order surface-related multiple pressure wavefield at the separation level based on the subsurface reflectivity and the normal derivative of the synthetic receiver-ghost pressure wavefield at the separation level; and
   extrapolating the synthetic first-order surface-related multiple pressure wavefield at the separation level to the coordinate location of the receiver to obtain a synthetic first-order surface-related multiple pressure wavefield at the coordinate location of the receiver.

6. The method of claim 1, wherein computing the synthetic pressure wavefield components comprises:
   computing a subsurface reflectivity of the subterranean formation at a separation level of the model environment;
   computing an incident wavefield at the separation level based on notional source signatures of source elements of the source;

computing a source-side scattered wavefield at the separation level based on the incident wavefield;
computing a normal derivative of the source-side scattered wavefield at the separation level;
computing a synthetic source-ghost pressure wavefield at the separation level based on the subsurface reflectivity and the normal derivative of the source-side scattered wavefield at the separation level;
computing a normal derivative of the synthetic source-ghost pressure wavefield at the separation level; and
computing a synthetic source-ghost pressure wavefield at the coordinate location of the receiver based on the normal derivative of the synthetic source-ghost pressure wavefield at the separation level.

7. The method of claim 6, further comprises:
computing a free-surface reflectivity of the time-varying free surface;
computing a normal derivative of the synthetic source-ghost pressure wavefield at the separation level;
computing a synthetic source-receiver ghost pressure wavefield at the separation level based on the free-surface reflectivity and the normal derivative of the synthetic source-ghost pressure wavefield at the separation level; and
extrapolating the synthetic source-receiver ghost pressure wavefield from the separation level to the coordinate location of the receiver to obtain a synthetic source-receiver ghost pressure wavefield at the coordinate location of the receiver.

8. The method of claim 7, further comprises:
computing a normal derivative of the synthetic source-receiver ghost pressure wavefield at the separation level;
computing a synthetic first-order surface-related multiple of source-ghost pressure wavefield at the separation level based on the subsurface reflectivity and the normal derivative of the synthetic source-receiver ghost pressure wavefield at the separation level; and
extrapolating the synthetic first-order surface-related multiple of source-ghost pressure wavefield from the separation level to the coordinate location of the receiver to obtain a synthetic first-order surface-related multiple of source-ghost pressure wavefield at the coordinate location of the receiver.

9. A system for generating an image of a subterranean formation, the system comprising:
one or more processors;
one or more data-storage devices; and
machine-readable instructions stored in the one or more data-storage devices that when executed using the one or more processors controls the system to perform operations comprising:
computing synthetic pressure wavefield components based on a model environment separated into a stationary region and a time-varying region that includes a time-varying free surface, each synthetic pressure wavefield component representing a portion of acoustic energy generated by a source in the time-varying region that travels between the time-varying free surface and a subsurface in the stationary region to a receiver; and
generating an image that reveals properties of the subterranean formation based on the model environment, the synthetic pressure wavefield components, and a pressure wavefield measured by receivers used in a marine seismic survey of the subterranean formation.

10. The system of claim 9, wherein computing the synthetic pressure wavefield components comprises:
computing an incident wavefield at a separation level of the model environment based on notional source signatures of source elements of the source;
extrapolating the incident wavefield to a coordinate location of a receiver;
computing a source-side scattered wavefield at the separation level based on the incident wavefield;
extrapolating the source-side scattered wavefield to the coordinate location of the receiver; and
combining the incident wavefield at the coordinate location of the receiver and the source-side scattered wavefield at the coordinate location of the receiver to obtain a synthetic direct pressure wavefield with ghost at the coordinate location of the receiver.

11. The system of claim 9, wherein computing the synthetic pressure wavefield components comprises:
computing a subsurface reflectivity of the subterranean formation at a separation level of the model environment;
computing an incident wavefield at the separation level based on notional source signatures of source elements of the source;
computing a normal derivative of the incident wavefield at the separation level;
computing a synthetic up-going pressure wavefield at the separation level based on the subsurface reflectivity and the normal derivative of the incident wavefield at the separation level;
computing a normal derivative of the synthetic up-going pressure wavefield at the separation level; and
computing a synthetic up-going pressure wavefield at the coordinate location of the receiver based on the normal derivative of the up-going pressure wavefield at the separation level.

12. The system of claim 11, further comprises:
computing a free-surface reflectivity of the time-varying free surface;
computing a normal derivative of the synthetic up-going pressure wavefield at the separation level;
computing a synthetic receiver-ghost pressure wavefield at the separation level based on the free-surface reflectivity and the normal derivative of the synthetic up-going pressure wavefield at the separation level; and
extrapolating the synthetic receiver-ghost pressure wavefield from the separation level to the coordinate location of the receiver to obtain a synthetic receiver-ghost pressure wavefield at the coordinate location of the receiver.

13. The system of claim 12, further comprises:
computing a normal derivative of the synthetic receiver-ghost pressure wavefield at the separation level;
computing a synthetic first-order surface-related multiple pressure wavefield at the separation level based on the subsurface reflectivity and the normal derivative of the synthetic receiver-ghost pressure wavefield at the separation level; and
extrapolating the synthetic first-order surface-related multiple pressure wavefield at the separation level to the coordinate location of the receiver to obtain a synthetic first-order surface-related multiple pressure wavefield at the coordinate location of the receiver.

14. The system of claim 9, wherein computing the synthetic pressure wavefield components comprises:

computing a subsurface reflectivity of the subterranean formation at a separation level of the model environment;
computing an incident wavefield at the separation level based on notional source signatures of source elements of the source;
computing a source-side scattered wavefield at the separation level based on the incident wavefield;
computing a normal derivative of the source-side scattered wavefield at the separation level;
computing a synthetic source-ghost pressure wavefield at the separation level based on the subsurface reflectivity and the normal derivative of the source-side scattered wavefield at the separation level;
computing a normal derivative of the synthetic source-ghost pressure wavefield at the separation level; and
computing a synthetic source-ghost pressure wavefield at the coordinate location of the receiver based on the normal derivative of the synthetic source-ghost pressure wavefield at the separation level.

15. The system of claim 14, further comprises:
computing a free-surface reflectivity of the time-varying free surface;
computing a normal derivative of the synthetic source-ghost pressure wavefield at the separation level;
computing a synthetic source-receiver ghost pressure wavefield at the separation level based on the free-surface reflectivity and the normal derivative of the synthetic source-ghost pressure wavefield at the separation level; and
extrapolating the synthetic source-receiver ghost pressure wavefield from the separation level to the coordinate location of the receiver to obtain a synthetic source-receiver ghost pressure wavefield at the coordinate location of the receiver.

16. The system of claim 15, further comprises:
computing a normal derivative of the synthetic source-receiver ghost pressure wavefield at the separation level;
computing a synthetic first-order surface-related multiple of source-ghost pressure wavefield at the separation level based on the subsurface reflectivity and the normal derivative of the synthetic source-receiver ghost pressure wavefield at the separation level; and
extrapolating the synthetic first-order surface-related multiple of source-ghost pressure wavefield from the separation level to the coordinate location of the receiver to obtain a synthetic first-order surface-related multiple of source-ghost pressure wavefield at the coordinate location of the receiver.

17. A non-transitory computer-readable medium encoded with machine-readable instructions to control one or more processors of a computer system to perform the operations comprising:
computing synthetic pressure wavefield components based on a model environment separated into a stationary region and a time-varying region that includes a time-varying free surface, each synthetic pressure wavefield component representing a portion of acoustic energy generated by a source in the time-varying region that travels between the time-varying free surface and a subsurface in the stationary region to a receiver; and
generating an image that reveals properties of the subterranean formation based on the model environment, the synthetic pressure wavefield components, and a pressure wavefield measured by receivers used in a marine seismic survey of the subterranean formation.

18. The medium of claim 17, wherein computing the synthetic pressure wavefield components comprises:
computing an incident wavefield at a separation level of the model environment based on notional source signatures of source elements of the source;
extrapolating the incident wavefield to a coordinate location of a receiver;
computing a source-side scattered wavefield at the separation level based on the incident wavefield;
extrapolating the source-side scattered wavefield to the coordinate location of the receiver; and
combining the incident wavefield at the coordinate location of the receiver and the source-side scattered wavefield at the coordinate location of the receiver to obtain a synthetic direct pressure wavefield with ghost at the coordinate location of the receiver.

19. The medium of claim 17, wherein computing the synthetic pressure wavefield components comprises:
computing a subsurface reflectivity of the subterranean formation at a separation level of the model environment;
computing an incident wavefield at the separation level based on notional source signatures of source elements of the source;
computing a normal derivative of the incident wavefield at the separation level;
computing a synthetic up-going pressure wavefield at the separation level based on the subsurface reflectivity and the normal derivative of the incident wavefield at the separation level;
computing a normal derivative of the synthetic up-going pressure wavefield at the separation level; and
computing a synthetic up-going pressure wavefield at the coordinate location of the receiver based on the normal derivative of the up-going pressure wavefield at the separation level.

20. The medium of claim 19, further comprises:
computing a free-surface reflectivity of the time-varying free surface;
computing a normal derivative of the synthetic up-going pressure wavefield at the separation level;
computing a synthetic receiver-ghost pressure wavefield at the separation level based on the free-surface reflectivity and the normal derivative of the synthetic up-going pressure wavefield at the separation level; and
extrapolating the synthetic receiver-ghost pressure wavefield from the separation level to the coordinate location of the receiver to obtain a synthetic receiver-ghost pressure wavefield at the coordinate location of the receiver.

21. The medium of claim 20, further comprises:
computing a normal derivative of the synthetic receiver-ghost pressure wavefield at the separation level;
computing a synthetic first-order surface-related multiple pressure wavefield at the separation level based on the subsurface reflectivity and the normal derivative of the synthetic receiver-ghost pressure wavefield at the separation level; and
extrapolating the synthetic first-order surface-related multiple pressure wavefield at the separation level to the coordinate location of the receiver to obtain a synthetic first-order surface-related multiple pressure wavefield at the coordinate location of the receiver.

22. The medium of claim 17, wherein computing the synthetic pressure wavefield components comprises:

computing a subsurface reflectivity of the subterranean formation at a separation level of the model environment;

computing an incident wavefield at the separation level based on notional source signatures of source elements of the source;

computing a source-side scattered wavefield at the separation level based on the incident wavefield;

computing a normal derivative of the source-side scattered wavefield at the separation level;

computing a synthetic source-ghost pressure wavefield at the separation level based on the subsurface reflectivity and the normal derivative of the source-side scattered wavefield at the separation level;

computing a normal derivative of the synthetic source-ghost pressure wavefield at the separation level; and computing a synthetic source-ghost pressure wavefield at the coordinate location of the receiver based on the normal derivative of the synthetic source-ghost pressure wavefield at the separation level.

23. The medium of claim 22, further comprises:

computing a free-surface reflectivity of the time-varying free surface;

computing a normal derivative of the synthetic source-ghost pressure wavefield at the separation level;

computing a synthetic source-receiver ghost pressure wavefield at the separation level based on the free-surface reflectivity and the normal derivative of the synthetic source-ghost pressure wavefield at the separation level; and extrapolating the synthetic source-receiver ghost pressure wavefield from the separation level to the coordinate location of the receiver to obtain a synthetic source-receiver ghost pressure wavefield at the coordinate location of the receiver.

24. The medium of claim 23, further comprises:

computing a normal derivative of the synthetic source-receiver ghost pressure wavefield at the separation level;

computing a synthetic first-order surface-related multiple of source-ghost pressure wavefield at the separation level based on the subsurface reflectivity and the normal derivative of the synthetic source-receiver ghost pressure wavefield at the separation level; and extrapolating the synthetic first-order surface-related multiple of source-ghost pressure wavefield from the separation level to the coordinate location of the receiver to obtain a synthetic first-order surface-related multiple of source-ghost pressure wavefield at the coordinate location of the receiver.

25. A method of manufacturing a geophysical data product, the method comprising:

computing synthetic pressure wavefield components based on a model environment separated into a stationary region and a time-varying region that includes a time-varying free surface, each synthetic pressure wavefield component representing a portion of acoustic energy generated by a source in the time-varying region that travels between the time-varying free surface and a subsurface in the stationary region to a receiver;

generating an image that reveals properties of a subterranean formation based on the model environment, the synthetic pressure wavefield components, and a pressure wavefield measured by receivers used in a marine seismic survey of the subterranean formation; and recording the image in a non-transitory computer-readable medium.

* * * * *